US011226976B2

(12) United States Patent
Kordasiewicz et al.

(10) Patent No.: US 11,226,976 B2
(45) Date of Patent: *Jan. 18, 2022

(54) SYSTEMS AND METHODS FOR GRAPHICAL EXPLORATION OF FORENSIC DATA

(71) Applicant: Magnet Forensics Investco Inc., Waterloo (CA)

(72) Inventors: Roman Czeslaw Kordasiewicz, Waterloo (CA); Michelle Elizabeth Allix MacKenzie, Waterloo (CA); Jared Daniel Windover, Waterloo (CA)

(73) Assignee: Magnet Forensics Investco Inc., Waterloo (CA)

(*) Notice: Subject to any disclaimer, the term of this patent is extended or adjusted under 35 U.S.C. 154(b) by 167 days.

This patent is subject to a terminal disclaimer.

(21) Appl. No.: 16/730,327

(22) Filed: Dec. 30, 2019

(65) Prior Publication Data

US 2020/0210416 A1   Jul. 2, 2020

Related U.S. Application Data

(63) Continuation of application No. 15/600,990, filed on May 22, 2017, now Pat. No. 10,565,221.
(Continued)

(51) Int. Cl.
*G06F 3/0482* (2013.01)
*G06F 16/248* (2019.01)
(Continued)

(52) U.S. Cl.
CPC ......... *G06F 16/248* (2019.01); *G06F 3/0482* (2013.01); *G06F 3/04812* (2013.01);
(Continued)

(58) Field of Classification Search
CPC .... G06F 16/248; G06F 16/285; G06F 21/552; G06F 3/0482; G06F 3/04812;
(Continued)

(56) References Cited

U.S. PATENT DOCUMENTS 6,850,252 B1    2/2005   Hoffberg
7,865,493 B2    1/2011   Kim et al.
(Continued)

FOREIGN PATENT DOCUMENTS

WO    WO2007/109721 A2    9/2007

OTHER PUBLICATIONS

Lopes Magarido, C.; "Communication pursuant to Article 94(3) EPC"; dated Apr. 12, 2021 for Application No. 17798463.0; European Patent Office, Munich, Germany.
(Continued)

*Primary Examiner* — Steven P Sax
(74) *Attorney, Agent, or Firm* — Woods Oviatt Gilman LLP; Dennis B. Danella, Esq.

(57) ABSTRACT

Methods and apparatus for examining digital forensic data using a viewer computer. Forensic data collections are provided to the viewer computer, which can format the data artifacts according to a variety of display types and presentation formats, to facilitate review and reporting by a user. The display types and presentation formats also enable the user to easily switch between a source location view and a related artifacts view.

19 Claims, 29 Drawing Sheets

Related U.S. Application Data

(60) Provisional application No. 62/339,333, filed on May 20, 2016.

(51) Int. Cl.

| | | |
|---|---|---|
| *G06F 16/28* | (2019.01) | |
| *G06Q 10/06* | (2012.01) | |
| *G06F 21/55* | (2013.01) | |
| *G06Q 10/00* | (2012.01) | |
| *G06F 3/0481* | (2013.01) | |

(52) U.S. Cl.
CPC .......... *G06F 16/285* (2019.01); *G06F 21/552* (2013.01); *G06Q 10/00* (2013.01); *G06Q 10/06* (2013.01)

(58) Field of Classification Search
CPC ..... G06F 3/0484; G06F 3/0488; G06Q 30/06; G06Q 10/06; H04L 63/145; G06K 9/00
See application file for complete search history.

(56) References Cited

U.S. PATENT DOCUMENTS

| | | |
|---|---|---|
| 8,566,903 B2 | 10/2013 | Roman et al. |
| 8,838,094 B2 | 9/2014 | Thing |
| 8,849,991 B2 | 9/2014 | Levy et al. |
| 8,914,406 B1* | 12/2014 | Haugsnes ........... H04L 63/1441 707/769 |
| 9,081,838 B2 | 7/2015 | Hoog |
| 9,183,580 B2 | 11/2015 | Rhoads |
| 9,224,067 B1 | 12/2015 | Lu |
| 9,241,010 B1 | 1/2016 | Bennett |
| 9,736,182 B1* | 8/2017 | Madhukar ............. H04L 63/102 |
| 10,073,840 B2 | 9/2018 | Hakkani-Tur |
| 10,430,712 B1* | 10/2019 | Reed ........................ G06N 5/04 |
| 10,565,221 B2* | 2/2020 | Kordasiewicz ....... G06F 16/285 |
| 2003/0182310 A1 | 9/2003 | Charnock et al. |
| 2003/0208689 A1 | 11/2003 | La |
| 2006/0064429 A1 | 3/2006 | Chi |
| 2007/0226796 A1 | 9/2007 | Gilbert |
| 2008/0082380 A1 | 4/2008 | Stephenson |
| 2008/0227063 A1* | 9/2008 | Kenedy ................... G06F 16/00 434/219 |
| 2009/0063557 A1* | 3/2009 | MacPherson ........... G06N 5/02 |
| 2009/0165142 A1 | 6/2009 | Adelstein |
| 2009/0307772 A1 | 12/2009 | Markham |
| 2010/0005073 A1 | 1/2010 | Bousquet et al. |
| 2010/0030734 A1* | 2/2010 | Chunilal ................ G06Q 10/10 707/770 |
| 2010/0226526 A1 | 9/2010 | Modro |
| 2010/0332475 A1 | 12/2010 | Birdwell et al. |
| 2011/0066968 A1 | 3/2011 | Goldsmith |
| 2011/0087516 A1* | 4/2011 | Frieden ................ G06Q 10/063 705/7.26 |
| 2011/0264677 A1 | 10/2011 | Hermitage et al. |
| 2012/0005631 A1 | 1/2012 | B'Far |
| 2012/0173390 A1 | 7/2012 | Lam |
| 2012/0215560 A1* | 8/2012 | Ofek ...................... G16H 10/00 705/3 |
| 2013/0097563 A1* | 4/2013 | Pacheco Rodrigues Velho .......... G06F 3/04815 715/850 |
| 2013/0124525 A1 | 5/2013 | Anderson et al. |
| 2014/0082001 A1 | 3/2014 | Jang |
| 2014/0294316 A1 | 10/2014 | Venkataravi |
| 2014/0325661 A1 | 10/2014 | Hoog |
| 2015/0112976 A1 | 4/2015 | Beebe |
| 2015/0121522 A1 | 4/2015 | Guido |
| 2015/0317475 A1 | 11/2015 | Aguayo Gonzalez |
| 2015/0339379 A1 | 11/2015 | Inagaki |
| 2015/0379426 A1 | 12/2015 | Steele |
| 2015/0379430 A1 | 12/2015 | Dirac |
| 2016/0132521 A1 | 5/2016 | Reininger et al. |
| 2016/0196324 A1* | 7/2016 | Haviv .................... G06F 3/0649 707/626 |
| 2016/0205137 A1* | 7/2016 | Babb ...................... G06F 21/552 726/1 |
| 2016/0275189 A1* | 9/2016 | Narayanan ............ G06F 3/0481 |
| 2016/0350165 A1* | 12/2016 | LeMond ................ G06F 11/079 |
| 2016/0364234 A1* | 12/2016 | DiMascio .................. G06F 8/30 |
| 2016/0373423 A1* | 12/2016 | Naibo .................. G06F 16/334 |
| 2017/0110093 A1* | 4/2017 | Stein ..................... G09G 5/026 |
| 2017/0277662 A1 | 9/2017 | Saliba et al. |
| 2021/0011955 A1 | 1/2021 | Kordasiewicz et al. |

OTHER PUBLICATIONS

Lopes Margarido, C., Extended European Search Report for EP Application No. 17798463.0, dated Nov. 4, 2019, Munich, Germany.

Chan, Alan, "PCT International Search Report", dated Oct. 6, 2017 for application No. PCT/CA2017/050608, Canadian Intellectual Property Office, Gatineau, Quebec K1A 0C9.

Chan, Alan, "Written Opinion of the International Searching Authority", dated Oct. 6, 2017 for application No. PCT/CA2017/050608, Canadian Intellectual Property Office, Gatineau, Quebec K1A 0C9.

Liendl, Martin, "European Search Report", dated Dec. 2, 2019 for application No. 18194686.4-1222, London WC2B 6AN, United Kingdom, 8 pages.

* cited by examiner

SYSTEMS AND METHODS FOR GRAPHICAL EXPLORATION OF FORENSIC DATA

RELATED APPLICATIONS

This application is a continuation of U.S. patent application Ser. No. 15/600,990 filed May 22, 2017, which claims the benefit of U.S. Provisional Patent Application No. 62/339,333 filed May 20, 2016, both of which are entitled SYSTEMS AND METHODS FOR GRAPHICAL EXPLORATION OF FORENSIC DATA, the entire contents of which are hereby incorporated by reference herein.

FIELD

The described embodiments relate to adaptive computer user interfaces and, in particular, to computer-generated user interfaces for digital forensic investigation.

BRIEF DESCRIPTION OF THE DRAWINGS

A preferred embodiment of the present invention will now be described in detail with reference to the drawings, in which:

FIG. 4A is an example of a graphical user interface, with the main view in a column detail presentation format;

FIG. 4B is an example of a graphical user interface, with the main view in another column detail presentation format;

FIG. 4C is an example of a graphical user interface, with the main view in a row detail presentation format;

FIG. 4D is an example of a graphical user interface, with the main view in a chat thread detail presentation format;

FIG. 4I is an example of a graphical user interface, with the main view in a filesystem presentation format;

FIG. 8E is an example of another graphical user interface, with the main view in a relation graph presentation format;

DESCRIPTION OF EXEMPLARY EMBODIMENTS

Figure 1:
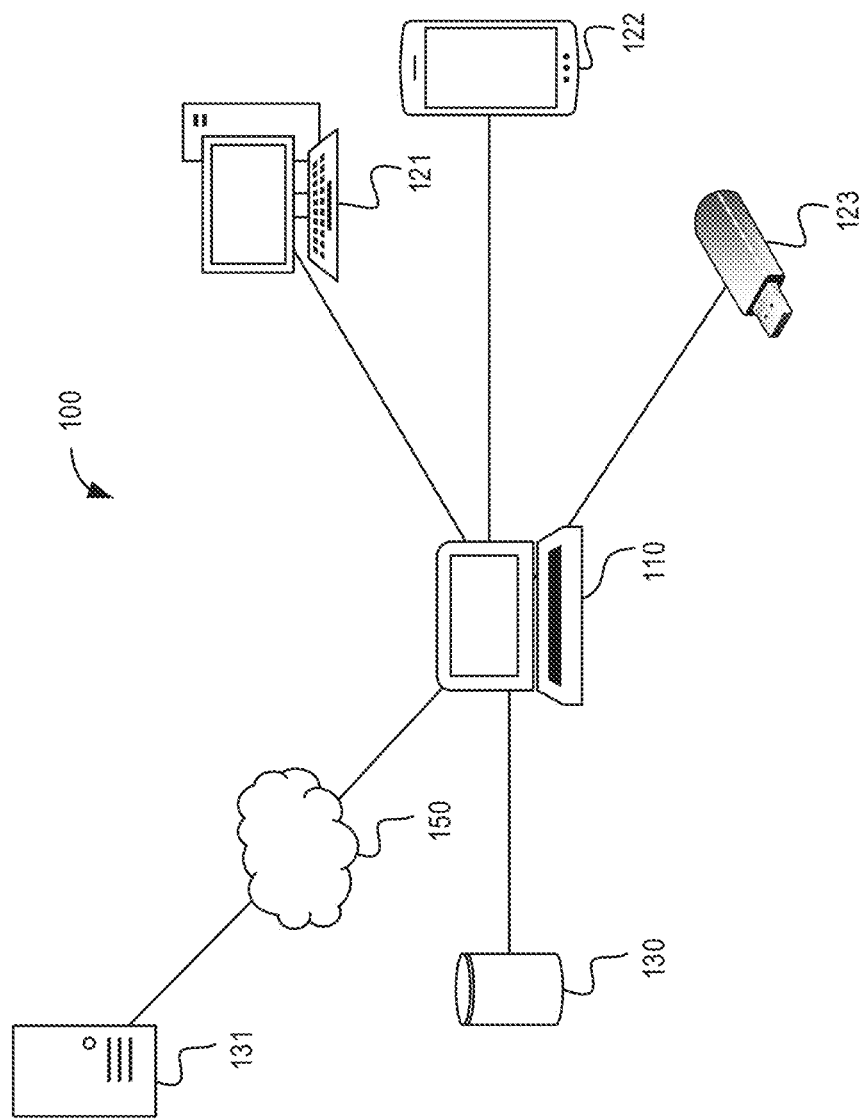
FIG. 1 is a block diagram of a digital forensic data investigation system in accordance with an example embodiment.

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object oriented programming. Accordingly, the program code may be written in C, C#, Java or any other suitable programming language and may comprise modules or classes, as is known to those skilled in computer programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

Historically, forensic data investigation tools have tended to focus on features rather than usability. Often, this has required significant training of user in order to use investigation tools effectively and correctly. Even with training, users may need periodic re-training in order to maintain their knowledge current. Without training, users may quickly forget how to use the prior art tools, leading to missed investigative opportunities, difficulty with reporting findings and other difficulties.

The described embodiments provide methods and apparatus for a forensic data investigation application, which provides enhances usability through data processing and presentation, along with novel user interface techniques. In addition, the described embodiments provide graphical user interfaces that may generally enhance the explorability of the forensic data investigation application. Examples of concepts that enhance explorability include: 1) automatically identifying data and artifacts that are related to an artifact of interest; and 2) a visual graph presentation that allows for easy identification of relationships.

Additionally, the described embodiments also facilitate efficient generation of reports and, in particular, may generate reports based on a "what you see is what you get" model. For example, reports may adopt a presentation format similar to that displayed in the graphical user interface. Likewise, reports may contain data items corresponding to those currently selected for display in the graphical user interface, in particular based on applied filters (whether implicit or explicit). The viewer computer may automatically generate and report relevant attributes (such as date and time, filesystem location, etc.) according to the data item category.

Referring now to FIG. 1, there is provided is a block diagram of a digital forensic data investigation system in accordance with an example embodiment.

Data investigation system 100 generally comprises a viewer computer 110, which is coupled to a data storage device 130, and which optionally may be coupled to one or more target devices, such as a desktop computer 121, mobile device 122 and data storage device 123. Coupling may be achieved using a physical connection, such as a Universal Serial Bus (USB) connector or cable, an IEEE 802.3 (Ethernet) network interface, or other suitable coupling interface or adapter. Target devices may also be any type of data storage media, such as magnetic and solid state disk drives, optical media, or network file shares.

Viewer computer 110 has one or more software application as described herein. As used herein, the term "software application" or "application" refers to computer-executable instructions, particularly computer-executable instructions stored in a non-transitory medium, such as a non-volatile memory, and executed by a computer processor. The computer processor, when executing the instructions, may receive inputs and transmit outputs to any of a variety of input or output devices to which it is coupled.

Optionally, viewer computer 110 may be provided with a forensic data investigation software application, to retrieve data from one or more target device. In some other cases, a separate computer may be provided with the forensic data investigation software application to retrieve data from the target device. For example, the forensic data investigation software application may do a low-level block-based copy from a target device storage media, to retrieve all data on the device, regardless of whether attempts have been made to delete the data. In other cases, the forensic data investigation software application may simply copy files and folders using operating system-level file copy facilities. Specific techniques for forensic data retrieval will be known in the art.

The forensic data investigation software application may analyze the retrieved data to identify data items of interest. Generally, data items can represent any data that can be retrieved from target device storage media, such as files, folders, block data or byte ranges, volume information, file images, and the like.

On their own, data items generally can be viewed using a text preview, which converts the raw data into a text representation (e.g., using ASCII or UTF coding), or in a binary or hexadecimal representation. However, reviewing large amounts of data items in this format is time-consuming and difficult. Therefore, viewer computer may generate, or the data collection may contain, a plurality of data artifacts.

Data artifacts are another type of data item that represents one or more other data items in a structured way.

A simple form of data artifact is one created based on file extensions of data items. For example, the viewer computer may generate a data artifact of type "documents" for a data item with a file extension of .DOC.

However, more advanced data artifacts can also be generated through the use of one or more refining modules. For example, the viewer computer may search for data patterns indicative of particular file types, such as media files, to generate media data artifacts or text data artifacts, respectively. Such generation of data artifacts can occur regardless of whether attempts have been made to obfuscate the nature of a particular file, for example, by changing a file extension or even deleting a file (where the underlying raw data can be recovered from unused space on the target device storage media).

Refining modules can be provided or defined for a wide variety of data artifacts. Examples of data artifacts that can be generated include, but are not limited to:
- Uniform resource locators (URLs), which can be parsed from a variety of sources, such as other documents, web browser histories, e-mails, chat messages and so on, URLs may be further sub-classified according to their nature (e.g., social media URLs, e-commerce URLs, peer-to-peer file sharing URLs, etc.);
- Web browser cookies, bookmarks, cache files, passwords and autofill data, history data, search queries, downloaded web pages, and more, all of which may be stored by the target device in a single database file;
- Instant messenger chat logs, which may be stored in database files;
- Call logs;
- Cached network files (e.g., from cloud-based file storage services);
- Photos, which may be stored in large databases with obfuscated file names;
- E-mail messages and attachments, which may be stored in monolithic database files or obfuscated files specific to a particular e-mail client software;
- Peer-to-peer file sharing history;
- Media files (including media files that were embedded in other file types);
- Documents, such as word processor, spreadsheet, presentation and other documents;
- Operating system configuration files, such as user account information, peripheral information, system cache files, network interface data, installed software data, and still more, all of which may be stored in registry databases or other binary or text extensible markup language (XML) files.

Each artifact can have one or more attributes associated therewith, sometimes called properties. Generally, an attribute can be any data related to an artifact, which includes, but is not limited to:
- Information explicitly contained in an artifact (e.g., profile name, application name, payload, etc.);
- Information implicit to the type of artifact (e.g., "Skype file transfer" and "Skype chat message" type artifacts are members of the "Skype" set);
- Information regarding the location from which an artifact was retrieved or generated (e.g., the file name of the source of the artifact);
- Information provided by the user such as tags or annotations (e.g., the user tags or applies a profile identifier with the name "Bob" to some number of artifacts, resulting in the "Bob" set which contains those specified artifacts); and
- Information provided by automated analysis, such as machine learning or deep learning (e.g., based on text in the artifact which the machine learning algorithm determines mentions "Bob").

The types of attributes that may be associated with an artifact can vary according to the type of artifact. For example, an instant messenger chat log artifact may have attributes for user id, user name, message date/time, etc. A media file artifact may have attributes for media length, bit rate, resolution, etc.

Some types of data items may be used to generate more than one data artifact. For example, an e-mail database may be used to generate a large number of data artifacts corresponding to individual e-mail messages.

Data items, including data artifacts, may be stored in a data collection, which can be an image file or an electronic database file stored in a data storage device 130. The electronic database file may be a relational database, such as Microsoft SQL Server™ or a non-relational database, such as a key-value database, NoSQL database, or the like. A data collection may contain data items retrieved from more than one target device and, because data artifacts are a type of data item, the data collection may also contain data artifacts generated by the viewer computer. Each data item in the data collection may be tagged with information to identify the target device that is the source of the data item.

Data storage device 130 is a non-volatile data store coupled to viewer computer 110. For example, data storage device 130 may be an external storage device coupled to viewer computer 110 locally, an internal device such as a hard drive. In some cases, viewer computer 110 may be coupled to a networked storage device 131 via a data communication network 150. Data communication network can be a private data communication network, such as a local area network or wide area network, or may also be a public data communication network, such as the Internet. When viewer computer 110 is configured to access data storage device 130 over a public network, or even over a private network, encryption (e.g., Transport Layer Security) can be used to safeguard data.

Viewer computer 110 is provided with a forensic data investigation application. In operation, the forensic data investigation application can be used to retrieve the data collection, e.g., from data storage device 130, and to generate a user interface to facilitate forensic investigation of the data collection as described further herein.

Figure 2:
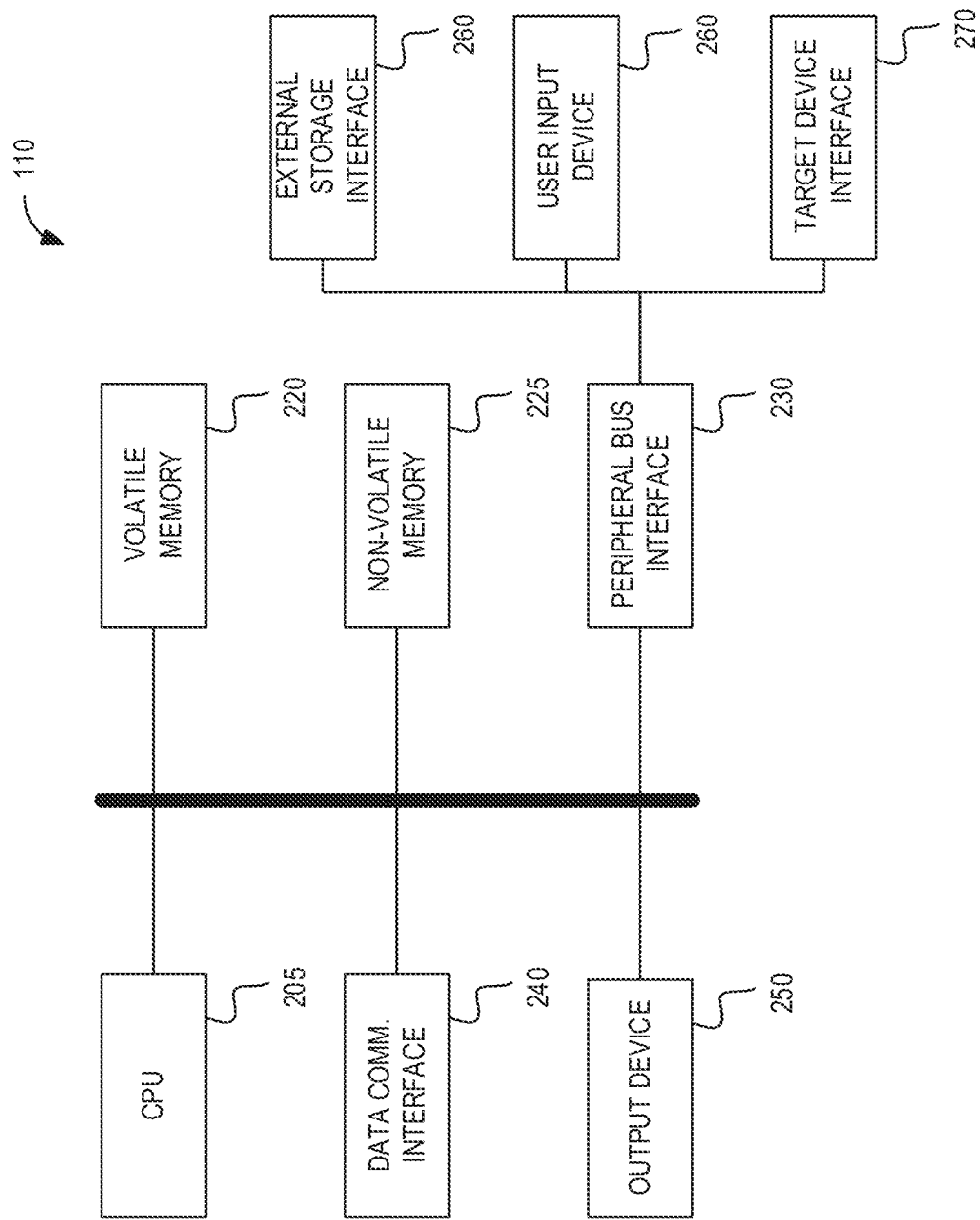
FIG. 2 is a simplified block diagram of a viewer computer in accordance with an example embodiment.

Referring now to FIG. 2, there is shown a simplified block diagram of a viewer computer in accordance with an example embodiment. Viewer computer 210 is one example of a viewer computer 110 as described in FIG. 1.

Viewer computer 210 has a processor 205, which is coupled to a volatile memory 220, a non-volatile memory 225, a peripheral bus interface 230, a data communications interface 240, an output device 250. The peripheral bus interface 230 may further couple processor 205 to an external storage interface 260, a user input device 260 and a target device interface 270. It will be appreciated that FIG. 2 is a simplified diagram of but one example embodiment, and that various other arrangements and computer system architectures may be used. For example, in some embodiments, data communications interface 240 may be coupled to processor 205 via peripheral bus interface 230.

Processor 205 is a computer processor, such as a general purpose microprocessor. In some other cases, processor 205 may be a field programmable gate array, application specific integrated circuit, microcontroller, or other suitable computer processor.

Processor 205 is coupled, via a computer data bus, to volatile memory 220 and non-volatile memory 225. Non-volatile memory 225 stores computer programs consisting of computer-executable instructions, which may be loaded into volatile memory 220 for execution by processor 205 as needed. It will be understood by those skilled in the art that references herein to a viewer computer as carrying out a function or acting in a particular way imply that a processor (e.g., processor 205 of viewer computer 210) is executing instructions (e.g., a software program) stored in a memory and possibly transmitting or receiving inputs and outputs via one or more interface. Volatile memory 220 may also store data input to, or output from, processor 205 in the course of executing the computer-executable instructions. In some cases, non-volatile memory 225 may store a data collection.

Processor 205 is also coupled to an output device 250, such as a computer display, which outputs information and data as needed by various computer programs. In particular, output device 250 may display a graphical user interface (GUI) generated by viewer computer 210.

Processor 205 is coupled to data communication interface 240, which is one or more data network interface, such as an IEEE 802.3 or IEEE 802.11 interface, for communication over a network.

Processor 205 may be coupled to a peripheral bus interface 230 via a data bus. In other embodiments, peripheral bus interface 230 may be omitted and processor 205 may be coupled to devices such as external storage interface 260 directly via a data bus.

In the example embodiment, peripheral bus interface 230 is coupled to an external storage interface 260, for example, to interface with external storage device 130.

Peripheral bus interface 230 is also coupled to one or more user input device 260, such as a keyboard or pointing device.

Finally, in some embodiments, peripheral bus interface 230 may also be coupled to a target device interface 270, for interfacing with and retrieving data from one or more target devices, such as target device 121 of FIG. 1.

In some embodiments, viewer computer 210 is a desktop or portable laptop computer 130. In other embodiments, viewer computer 210 may be a mobile device such as a smartphone or tablet computer.

Figure 3:
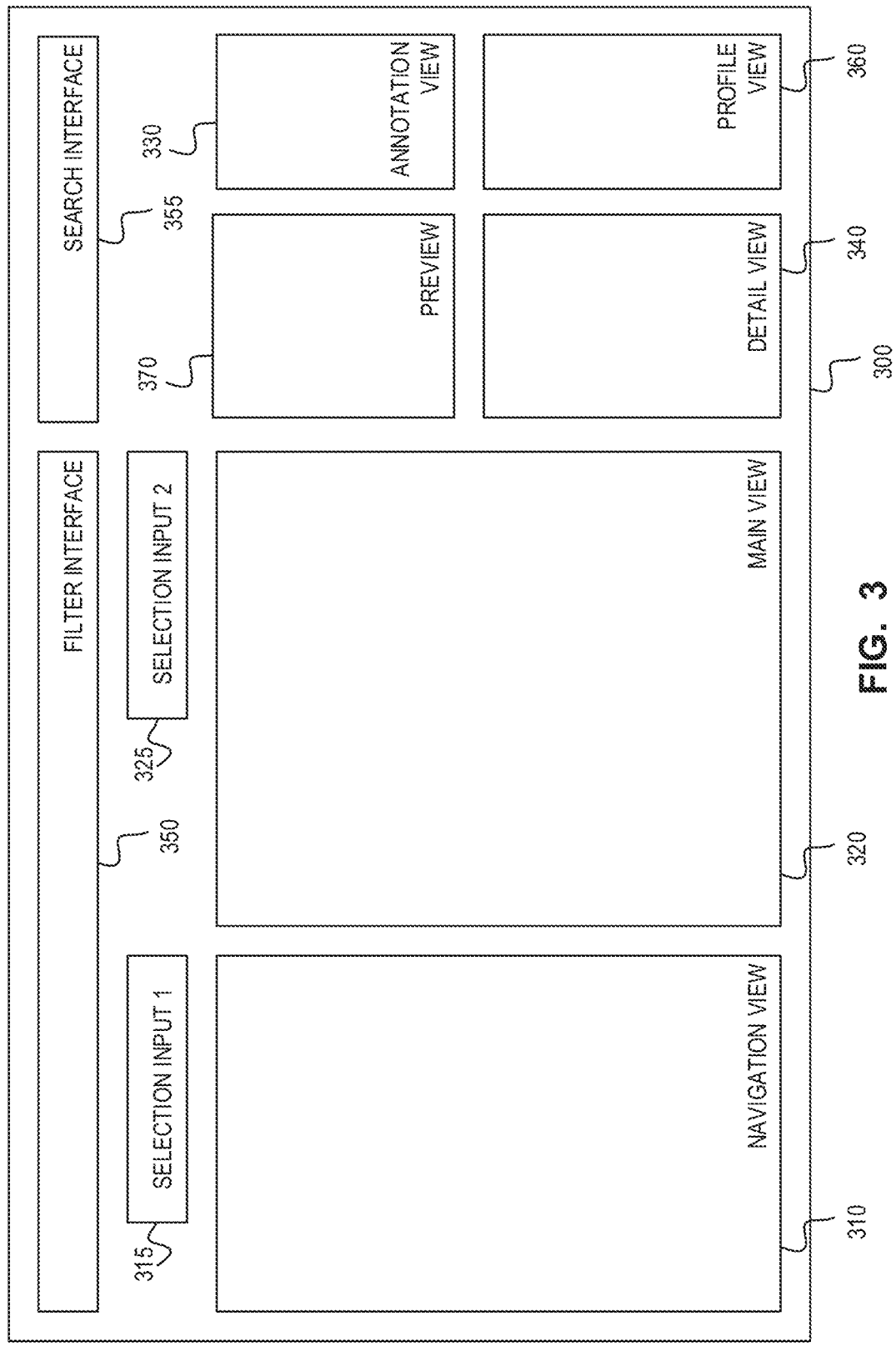
FIG. 3 is a graphical user interface of a forensic data investigation application in accordance with an example embodiment.

Referring now to FIG. 3, there is shown a graphical user interface of a forensic data investigation application, in accordance with an example embodiment.

Graphical user interface 300 may be generated by a viewer computer, such as viewer computer 110 or viewer computer 210, and displayed on a display such as output device 250 of viewer computer 210.

In particular, graphical user interface 300 may be generated and displayed to allow a user of the viewer computer to review and examine data items within a data collection, as generated by a forensic data investigation software application.

In the example embodiment, graphical user interface 300 has a navigation view area 310, a selection input 315, a main view area 320, a selection input 325, an annotation view area 330, a detail view area 340, a filter interface 350 and a search interface 355. Each of the areas or elements of graphical user interface 300 (e.g., navigation view 310, main view 320, annotation view 330, detail view 340 and preview 370) may be repositioned, resized, detached and displayed in a separate window (as shown in FIG. 4L) or hidden from view, while remaining synchronized with the other elements. In some cases, additional elements may be displayed. In still other embodiments, various elements may be combined. For example, a preview may be displayed within a detail view 340.

Navigation view 310 may be used to display organizational data relating to data items. For example, while in an artifact view display type, navigation view 310 may be formatted to display one or more categories or subcategories of data artifacts, or both. A user of the viewer computer may select such categories or subcategories, to cause the viewer computer to search within a current data collection and generate a display of data artifacts within the selected categories or subcategories in a main view 320. Selection of a category or subcategory in navigation view 310 can be used as a type of implicit filter, in addition to explicit or contextual filters as described elsewhere herein.

Selection input 315 may be used to change the display type of navigation view 310. For example, selection input 315 may be a button or group of buttons or a drop-down dialog box, which allows the user to select one of a plurality of display types. One display type is the artifact view display type. However, examples of other display types are a filesystem display type, a database display type, a registry view display type, and generic display types.

In general, operation of the selection input 315 serves to change the display type of navigation view 310. In some cases, this change in display type may cause the presentation format of main view 320 to be changed accordingly. In such cases, viewer computer may attempt to retain the previously selected data items within main view 320 to the extent possible.

In a filesystem display type, navigation view 310 may be formatted to display a filesystem hierarchy corresponding to that of the target device or target devices used to generate the current data collection. For example, if a target device is a laptop computer, the displayed filesystem hierarchy may correspond to that of the target laptop computer's mass storage device (e.g., solid state disk). The navigation view 310 may allow the user to navigate within the filesystem hierarchy and select directories, the contents of which (i.e., data items originally found in the selected directory) can be displayed in main view 320. The navigation view 310 may allow for filesystem hierarchies to be expanded and collapsed, for example, by use of a disclosure triangle control.

In some cases, the filesystem display type may also display data items relating to filesystem components such as disk partitions, unallocated space, logical volumes, deleted files, and other objects associated with a filesystem.

In a registry view display type, navigation view 310 may be formatted to display a system registry hierarchy, such as the Microsoft Windows™ registry. For other operating systems, the registry view display type may be adapted to display system configuration files and information. For example, for the Mac OS X™ operating system, the registry view display type may display XML files and key-value data corresponding to system configuration settings. The navigation view 310 may allow the user to select certain registry parameters, and data items associated with the selected registry parameters can be displayed in main view 320. For example, the navigation view may display a registry tree, the registry tree having selectable registry tree elements that can be used to filter the displayed data items in main view 320 according to a selected registry tree element.

In a database display type, navigation view 310 may be formatted in similar fashion to filesystem display type, to display a filesystem hierarchy containing a database file or files, such as the file containing a SQL database. The navigation view 310 may allow the user to identify a database to examine, and data items associated with the selected database can be displayed in main view 320 in a database presentation format.

Main view 320 generally is used for the display of data items. Data items may be displayed in one or more presentation formats. Examples of presentation formats include, but are not limited to, column detail, row detail, chat thread, thumbnail, timeline, map, filesystem, registry and relation graph. A selection input 325, such as a drop-down dialog, can be used to change between presentation formats.

In general, operation of the selection input 325 serves to change the presentation format of main view 320. Viewer computer may attempt to retain the previously selected data items within main view 320 to the extent possible for the presentation format.

Many of the described presentation formats allow for the display of data items in a heterogeneous list, that is, displaying more than one type of data item contemporaneously in main view 320. For example, a main view 320 in a row detail presentation format may display data artifacts of the media category, data artifacts of the chat category, data artifacts of the web browser category, data items of the file type, and still others in a single list (as shown in main view 420 of FIG. 4C, for example). Other presentation formats can also display data items of multiple categories. For example, a column detail presentation format can similarly display data items of multiple categories in main view 320, in some cases displaying additional columns for attributes specific to each type of displayed data item.

When a particular data item is selected in main view 320, attributes of the data item also can be displayed in detail view 340 in a detailed summary format. Detail view 340 may be scrollable or resizable, or both, to allow a user to view all attributes relating to the selected data item. In some cases, detail view may also include a preview of the data item. In other cases, the preview may have a separate view.

Generally, detail view 340 can provide a summary of the attributes for a selected data item, where those attributes may also be displayed in columns of a column detail presentation format.

In some cases, multiple data item may be selected in main view 320, in which case detail view 340 may display aggregate information relating to, or common to, all selected data items.

A preview area 370 may also be provided in some cases. As the name implies, the preview area may display a preview of a selected data item. For example, for a media data artifact, preview area 370 may display a resized image or an image thumbnail of a video. In another example, for a document data artifact, preview area 370 may display a rendering of the document contents. In some cases, where the selected item is not a data artifact, preview area 470 may contain a text view which displays text strings extracted from the selected data item, or a hex view, which displays data in raw hexadecimal format for the selected data item. Various other types of previews for different types of data artifacts may also be displayed using a suitable renderer.

Annotation view 330 can be used to allow a user to tag data items with labels or annotations. Tags can be applied to any type of data item described herein, whether or not they are also data artifacts (e.g., files, folders, chat artifacts, etc.). Annotation view 330 may include predefined tags or labels, which can be selected in the graphical user interface 300. In some cases, annotation view 330 may allow the user to define additional tags or labels, comments and profiles, which can be applied to selected data items. Once defined, tags or labels, comments and profiles can be used as search or filter criteria.

Profile view 360 can be used to allow a user to assign a profile identifier to a data item. The profile identifier may be generated by the viewer computer when a new profile is created, and may optionally be given a friendly name by the viewer computer or the user. Generally, when the user assigns a profile identifier to a data item, viewer computer can parse the data item—which may be a data artifact—to determine whether the data item contains a unique user identifier, such as an e-mail address, chat service username, phone number, address or the like. The viewer computer may then analyze other data items within the data collection to identify instances of the unique user identifier, and assign the same profile identifier to those data items. The profile identifier can then be used to filter data items, for example using filter interface 350, allowing the user to quickly and easily identify data items that relate to a particular profile, which may itself relate to a particular person of interest. In some embodiments, profile identifiers may only be assigned to data artifacts.

Filter interface 350 can be used to filter the data items displayed in main view 320 or also navigation view 310. In general, filter interface 350 can be used to filter on any attribute of a data item, including but not limited to, type or category, dates and times, and tags. Filters can also be combined, for example by applying multiple filters successively. In some cases, Boolean operators, such as AND, OR or NOT may be applied to combine filters. In some embodiments, filter interface 350 may allow for pattern matching, e.g., with regular expressions, to be used to define filters.

When a filter is selected or applied, an active filter indication may be provided, to indicate that the filter is in effect and thereby limiting the data items displayed. In some cases, the active filter indication is a shading of the filter dialog, for example with a color. The active filter indication can be removed when all filters are deselected.

Similarly, search interface 355 can be used to enter freeform text and search for specific attributes, such as names, types, dates, and the like. An advanced search interface can also be provided, to allow a user to craft specific searches.

Figure 4A:
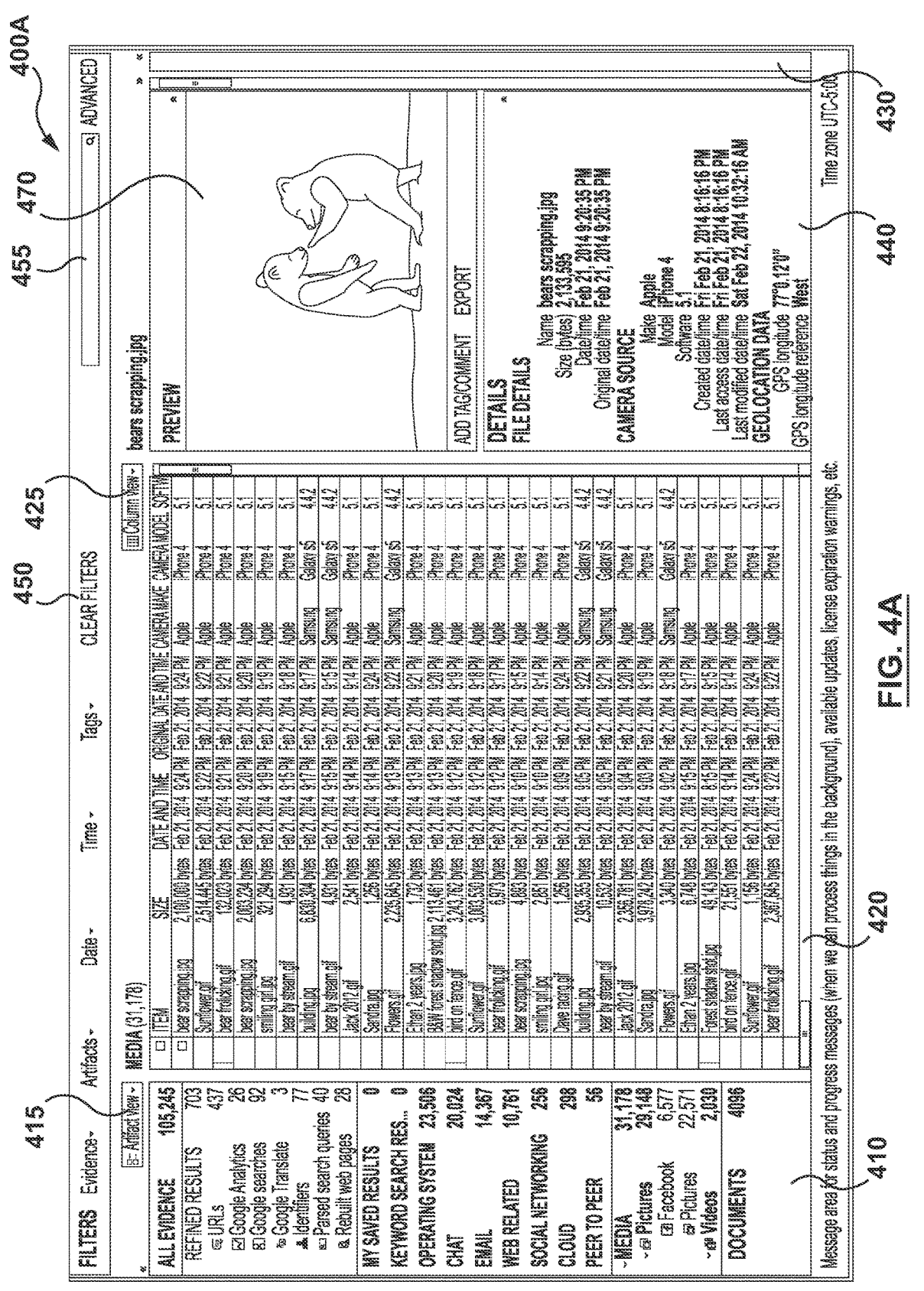

Referring now to FIG. 4A, there is shown an example of a graphical user interface, with the main view in a column detail presentation format. Graphical user interface 400A is one example embodiment of graphical user interface 300. The elements of FIG. 4A are numbered using reference numerals in the 400s, however unless otherwise noted these elements are generally analogous to those of similarly-numbered elements with reference numerals in the 300s, as shown in FIG. 3. For example, filter interface 450 is analogous to filter interface 350, navigation view 410 is analogous to navigation view 310, main view 420 is analogous to main view 320, and so on.

In graphical user interface 400A, main view 420 displays the column detail presentation format as indicated by selection input 425. Each row of the column detail presentation format corresponds to one data item, and each column of the column detail presentation format displays an attribute for each data item. Navigation view 410 is shown in an artifact view display type as indicated by selection input 415, with a media category selected. Accordingly, main view 420 is displaying data artifacts of the media category. The displayed columns in FIG. 4A are therefore name, byte size, modification date and time, original creation date and time, camera make, camera model and software. Additional columns are obscured due to the size of main view 420, but can be viewed by scrolling right.

More generally, in a column detail presentation format, data items may be presented in a vertical list, with attributes of each data item set out in columns. Each column may have a heading, which can be sorted by the user (e.g., by clicking the column header to select which column to sort on), or used to define a filter. Examples of attributes include those shown in FIG. 4A, such as a data item name or identifier, a byte size, a last modification date and time, a creation date and time, last access date and time, camera make and model, and the like.

Columns may be reordered, added or hidden from view.

In some cases, a column heading may be used to define a filter and, in particular, a contextual filter. For example, a user may transmit a command to define a contextual filter by option-clicking or right-clicking on a column heading. Viewer computer may determine the type of data contained in the column, and provide a contextual control to allow the user to define filter criteria specific to the column. In one example, if the column contains date data, the contextual control may accept a start date and an end date. In another example, if the column contains numerical data, the context control may accept a lower bound and an upper bound. In general, a contextual filter can also be used to limit the display only to those data items with attributes belonging in a particular column.

In some cases, the columns presented in column detail presentation format may be context sensitive. For example, when navigation view 410 is in an artifact view display type, the selection of different artifact categories in navigation view 410 may cause the columns in main view 420 to be altered. For example, if data artifacts belonging to a chat category are displayed, one column of main view 420 may indicate attributes specific to chat artifacts, such as the type of chat (e.g., Yahoo!™, ICQ™, etc.), message sent date, etc. Similarly, when data artifacts belonging to an e-mail category are selected, the columns of main view 420 may display attributes specific to e-mail, such as the sender, recipient, subject, sent date and various other fields. When data artifacts belong to a photo media category are selected, the columns of main view 420 may display attributes specific to media, such location data (if available), camera make and model, image size, and other image metadata. However, in some cases, data artifacts of multiple categories can be displayed together in main view 420 (e.g., when the "all evidence" category is selected).

In general, the columns of main view 420 can be used to display attributes or metadata relating to each data item.

Figure 4B:
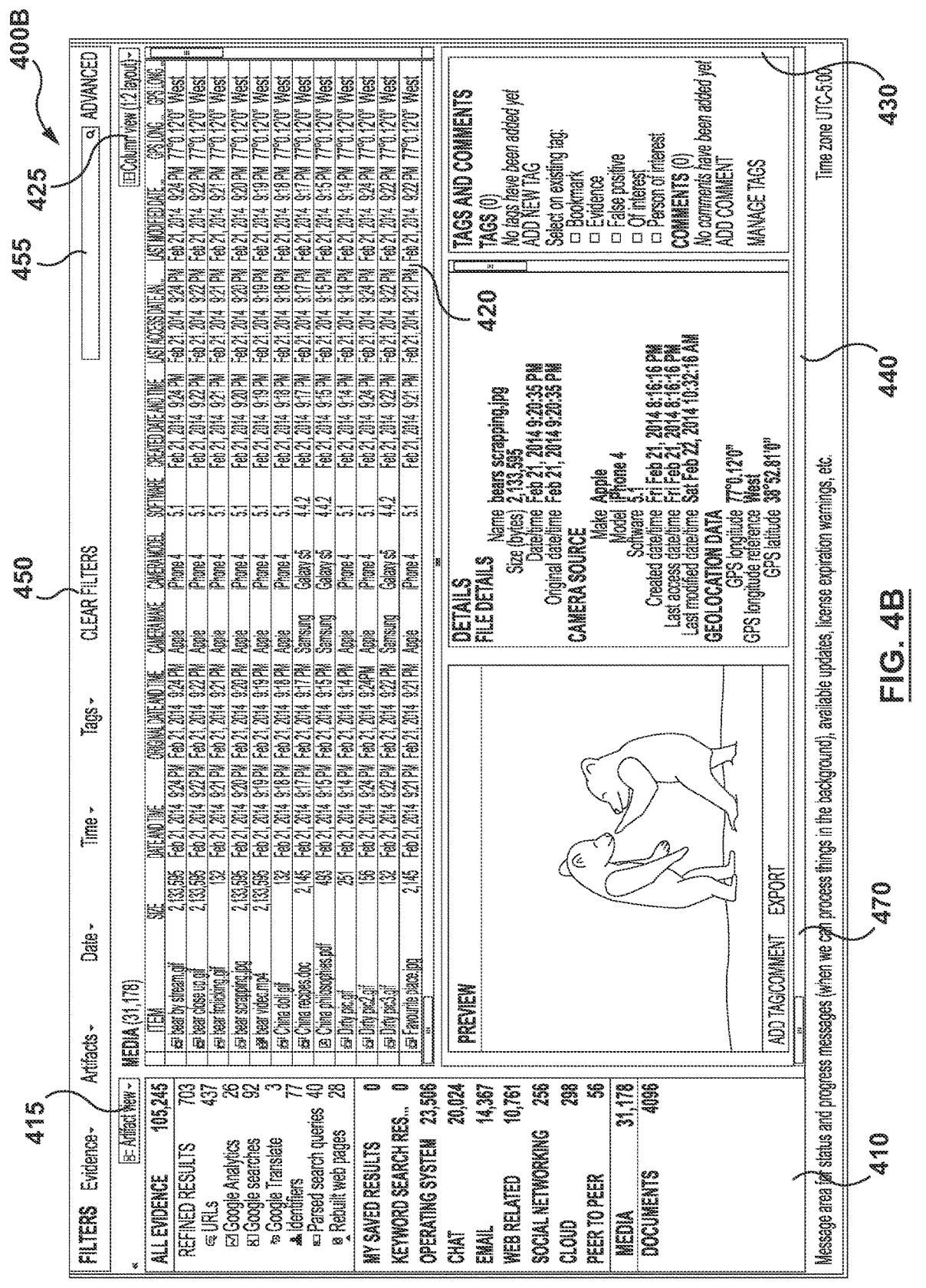

Referring now to FIG. 4B, there is shown an example of a graphical user interface, with the main view in another column detail presentation format. Graphical user interface 400B is generally analogous to graphical user interface 400A, except that certain elements have been repositioned and resized. In addition, annotation view 430 has been expanded from a collapsed state.

Figure 4C:
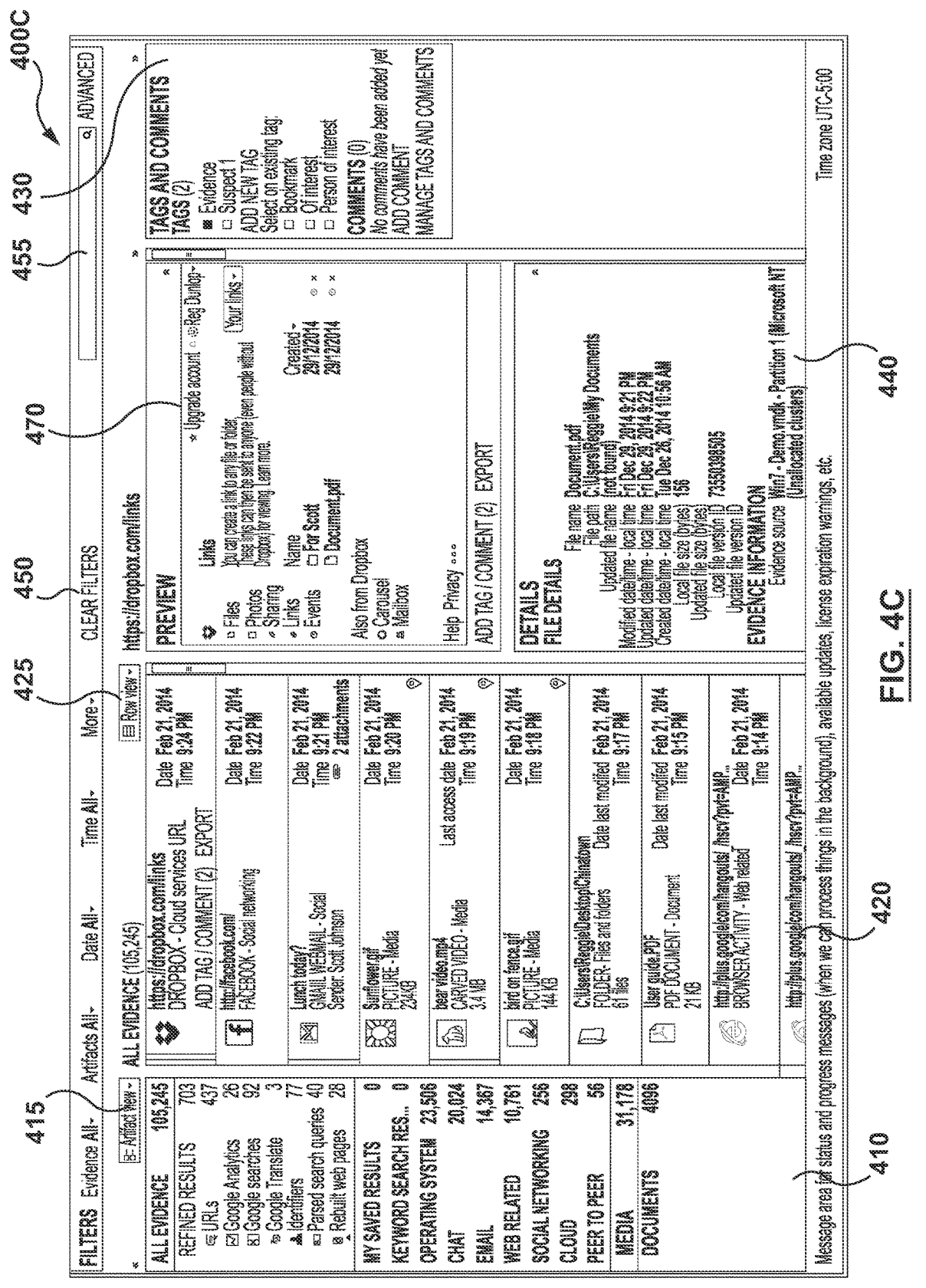

Referring now to FIG. 4C, there is shown an example of a graphical user interface, with the main view in a row detail presentation format. Graphical user interface 400C is one example embodiment of graphical user interface 300. The elements of FIG. 4C are numbered using reference numerals in the 400s, however unless otherwise noted these elements are generally analogous to those of similarly-numbered elements with reference numerals in the 300s, as shown in FIG. 3. For example, filter interface 450 is analogous to filter interface 350, navigation view 410 is analogous to navigation view 310, main view 420 is analogous to main view 320, and so on.

In graphical user interface 400C, main view 420 displays the row detail presentation format as indicated by selection input 425. Each cell of the row detail presentation format corresponds to one data item, with attribute information relating to the data item laid out in a table. Navigation view 410 is in an artifact view display type as indicated by selection input 415, with no category selected. This may be referred to as an "all evidence" category. Accordingly, main view 420 is displaying data artifacts of any category.

Main view 420 shows various data artifacts, including URL artifacts, social network artifacts, media artifacts, document artifacts and browser artifacts. Each cell in main view 420 contains an icon or thumbnail preview, an artifact name, and attributes specific to the data artifact type. Data artifacts of different types may have different attributes shown in the row detail presentation format. Accordingly, as with other presentation formats, the row detail presentation format can be used when the user wishes to view data artifacts of different types together in main view 420. However, the row detail presentation format provides a more compact view in some cases.

More generally, in a row detail presentation format, data artifacts may be presented in a vertical list of cells (which can be subdivided in a table-like format), with attributes of each data artifact set out within each cell. Each cell can be selected and used to perform a context switch as described elsewhere herein, to reveal a source location of the data artifact.

As noted above, the attributes presented in each cell of the row detail presentation format may be context sensitive. For example, if data artifacts belonging to a media category and an e-mail category are displayed, the e-mail artifact cell in main view 420 may display e-mail attributes, such as sender and number of attachments, whereas the media artifact cell may display a media type.

In general, the cells of main view 420 when in a row detail presentation format can be used to display attributes or metadata relating to each respective data artifact.

In some cases, the row detail presentation format may also be used for data items, more generally.

Figure 4D:
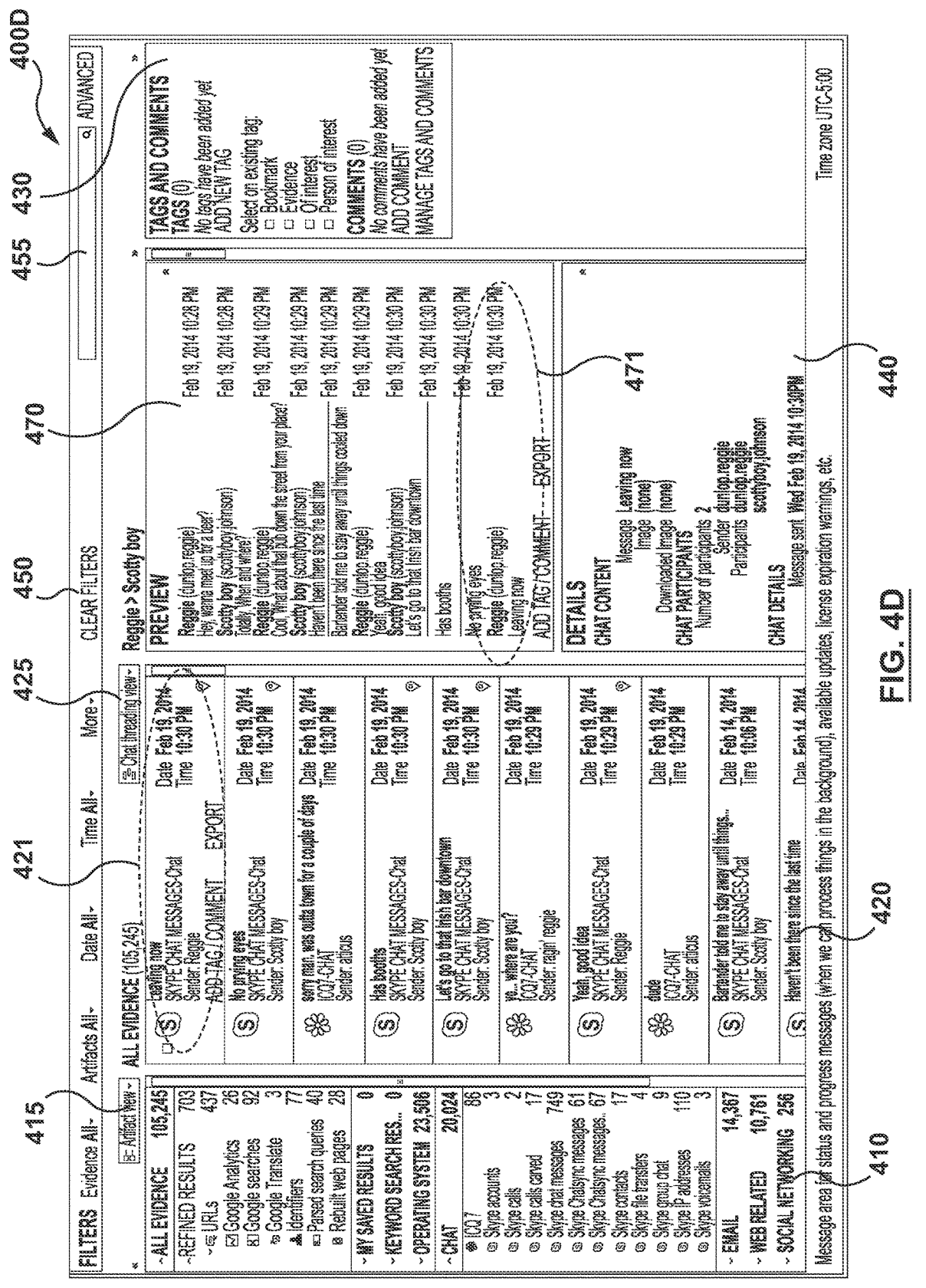

Referring now to FIG. 4D, there is shown an example of a graphical user interface, with the main view in a chat thread detail presentation format. Graphical user interface 400C is one example embodiment of graphical user interface 300. The elements of FIG. 4D are numbered using reference numerals in the 400s, however unless otherwise noted these elements are generally analogous to those of similarly-numbered elements with reference numerals in the 300s, as shown in FIG. 3. For example, filter interface 450 is analogous to filter interface 350, navigation view 410 is analogous to navigation view 310, main view 420 is analogous to main view 320, and so on.

In graphical user interface 400D, main view 420 displays the chat thread detail presentation format as indicated by selection input 425. Each cell of the chat thread detail presentation format corresponds to one data artifact, with attribute information relating to the artifact laid out in a table, similar to row detail presentation format shown in FIG. 4C. Navigation view 410 is in an artifact view display type as indicated by selection input 415, with a chat category selected. Accordingly, main view 420 is displaying artifacts belonging to the chat category.

Each cell in main view 420 contains an icon representative of the chat service associated with the data artifact, a message sender and date and time. Each cell may also contain a link to a location associated with the message. Chat artifacts can be created by parsing a chat client database to extract the various attributes, for example.

When a cell is selected in main view 420, the viewer computer may generate a contextually-aware message thread for display in preview area 470. For example, in FIG. 4D, cell 421 is shown as selected in main view 420. Accordingly, a message thread containing the data artifact displayed in cell 421 has been generated and displayed in preview area 470. The specific message is displayed at entry 471, while additional context has been provided by retrieving additional data artifacts associated with the selected data artifact. These data artifacts are presented in chronological order to provide context for the user.

Each cell can be selected and used to perform a context switch as described elsewhere herein, to reveal a source location of the data artifact.

More generally, in a chat thread detail presentation format, data artifacts may be presented in a vertical list of cells (which can be subdivided in a table-like format), with attributes of each data artifact set out within each cell. When a chat data artifact is selected, the preview area 470 can be used to show the chat data artifact in the context of the chat in which the artifact was first created.

The attributes presented in each cell of the chat thread detail presentation format may be context sensitive. For example, attributes may be unique to a particular chat service.

Figure 4E:
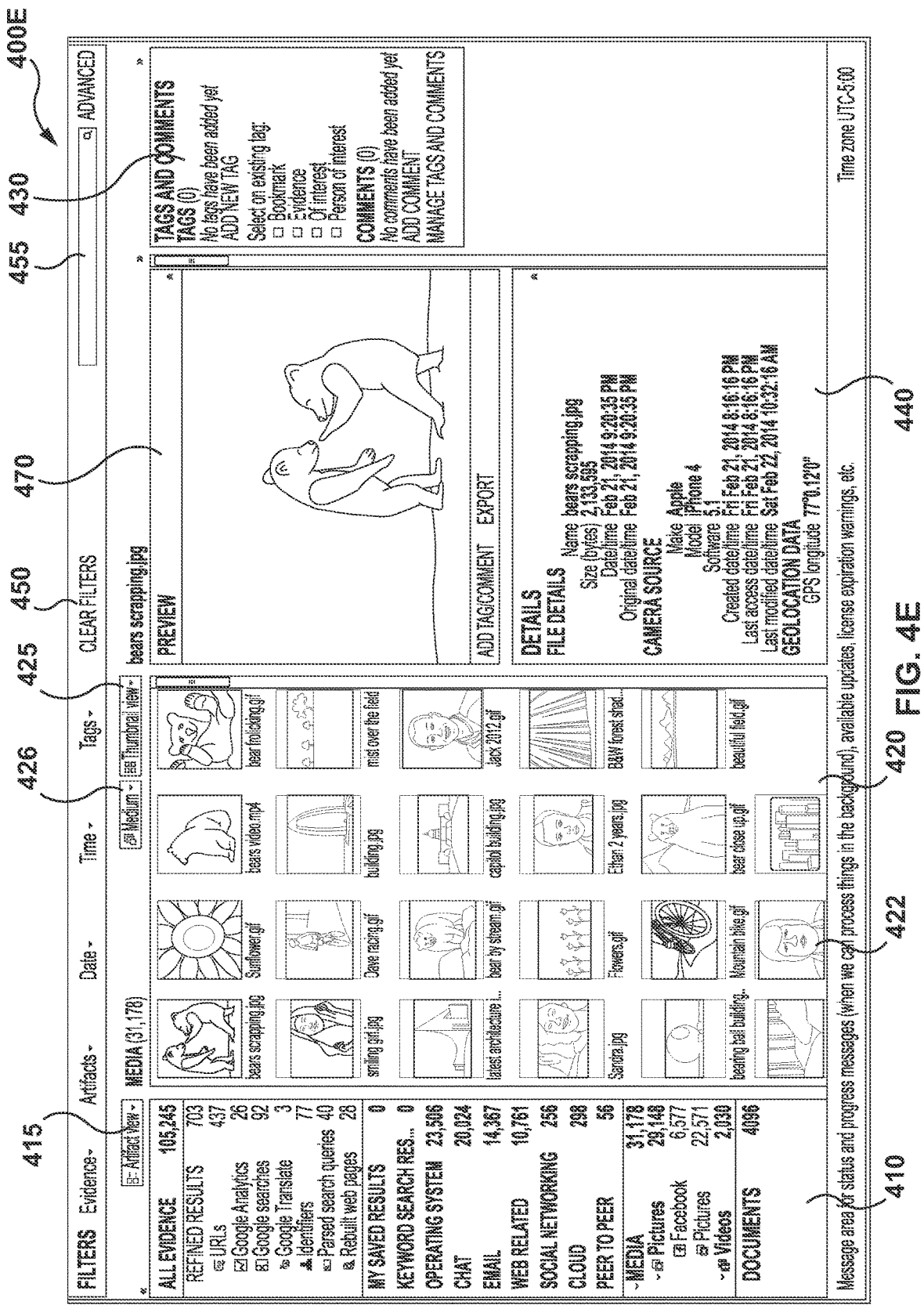
FIG. 4E is an example of a graphical user interface, with the main view in a thumbnail presentation format.

Referring now to FIG. 4E, there is shown an example of a graphical user interface, with the main view in a thumbnail presentation format. Graphical user interface 400E is one example embodiment of graphical user interface 300. The elements of FIG. 4E are numbered using reference numerals in the 400s, however unless otherwise noted these elements are generally analogous to those of similarly-numbered elements with reference numerals in the 300s, as shown in FIG. 3. For example, filter interface 450 is analogous to filter interface 350, navigation view 410 is analogous to navigation view 310, main view 420 is analogous to main view 320, and so on.

In graphical user interface 400E, main view 420 displays the thumbnail presentation format as indicated by selection input 425. Thumbnail presentation format generates and displays one or more thumbnail image 422, corresponding to data artifacts selected in navigation view 410. Navigation view 410 is in an artifact view display type as indicated by selection input 415, with a generic media category selected. Accordingly, main view 420 is displaying artifacts of all media categories.

In some cases, thumbnail presentation format may also be used for data items more generally.

Main view 420 shows thumbnail images 422 for photo and other static image artifacts and may also display thumbnail images (e.g., JPEG, GIF, PNG) for video artifacts. In some cases, the thumbnail images may contain playable video, which can be activated by clicking on or hovering a cursor over the thumbnail image in main view 420, for example. In some cases, selection of the thumbnail may cause media controls to displayed in preview area 470. Thumbnail images 422 are labeled with the artifact name, and may optionally be labeled with additional attribute information.

A thumbnail size control 426, such as a drop-down dialog or a slider, can also be provided, to allow a user to adjust the size of the thumbnail images 422.

Figure 4F:
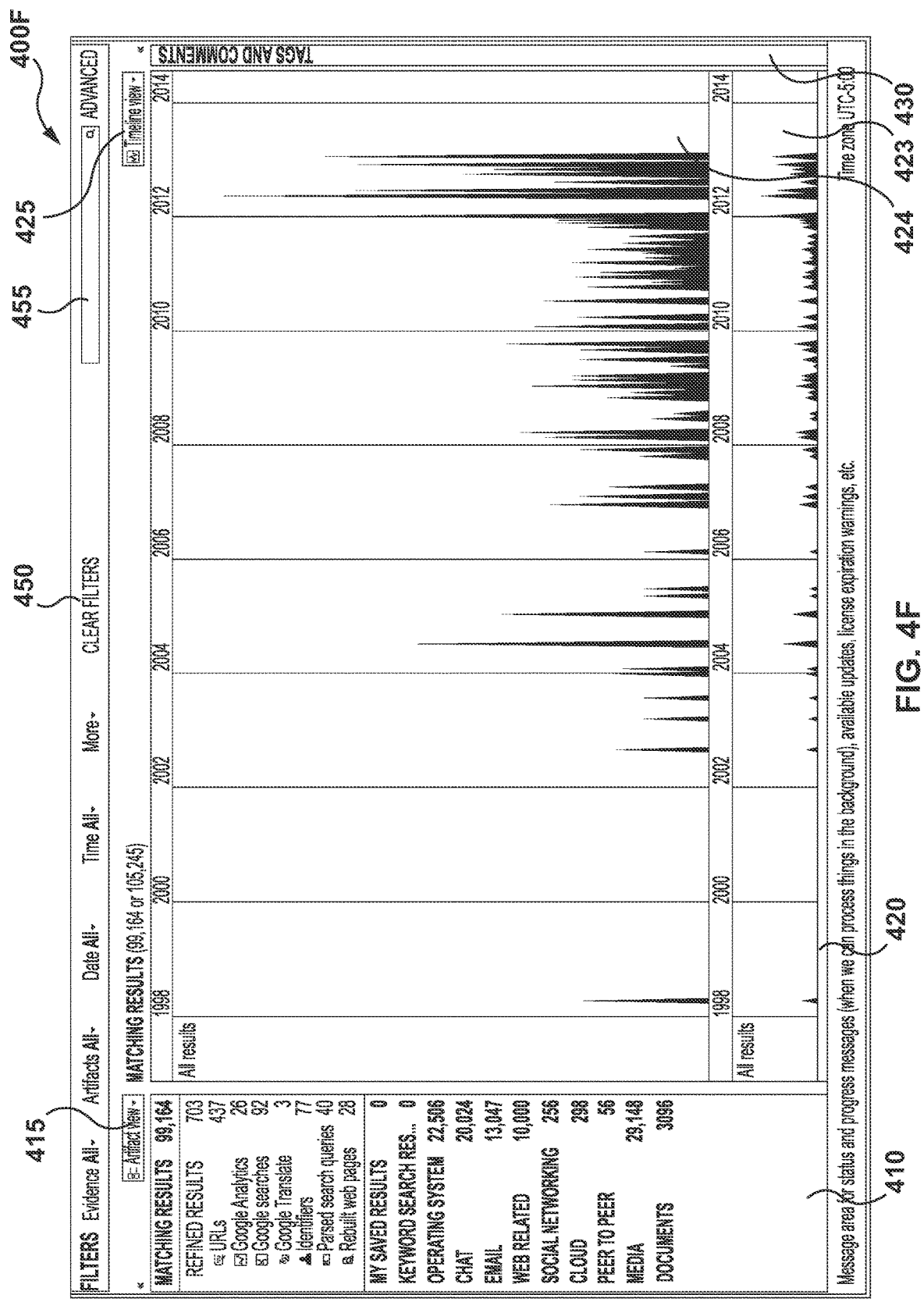
FIG. 4F is an example of a graphical user interface, with the main view in a timeline presentation format.

Referring now to FIG. 4F, there is shown an example of a graphical user interface, with the main view in a timeline presentation format. Graphical user interface 400C is one example embodiment of graphical user interface 300. The elements of FIG. 4F are numbered using reference numerals in the 400s, however unless otherwise noted these elements are generally analogous to those of similarly-numbered elements with reference numerals in the 300s, as shown in FIG. 3. For example, filter interface 450 is analogous to filter interface 350, navigation view 410 is analogous to navigation view 310, main view 420 is analogous to main view 320, and so on.

In graphical user interface 400F, main view 420 displays the timeline presentation format as indicated by selection input 425. The timeline presentation is generated by viewer computer by aggregating data artifacts with date and time information, and generating an interactive graph visualization. In some cases, the timeline presentation can be used for data items more generally, where those data items have date and time information (e.g., files and folders). Individual data artifacts are represented as points along the x-axis (timeline), and data artifacts that are close in time to each other are stacked in the y-axis along the timeline. This produces a bar chart that enables easy visualization of the creation or modification dates of data artifacts. Spikes in the chart are indicative of a large number of data artifacts that are close together in time. Generally, the width and height of the timeline may be adjusted in response to changes in the displayed data artifacts. For example, as data artifacts are selected for display that require a longer timeline, the timeline may be scaled in the x-axis to display all selected data artifacts within main view 420. Similarly, as data artifacts are stacked, the scale of the timeline along the y-axis may be adjusted accordingly, to accommodate all stacks.

In operation, a user may hover over a slice of the chart to cause a pop-over tooltip to be displayed with contextual information, such as the number and type of data artifacts represented by the slice. The timeline presentation format may allow for zooming in or out on a slice. Selection of a slice may, in some cases, cause a different presentation format (e.g., column detail) to be generated containing the data artifacts belonging to the slice.

In some embodiments, multiple timelines may be shown concurrently. For example, a primary timeline 423 may be provided, which provides a visualization of all dates associated with data artifacts. One or more secondary timelines 424 or "swim lanes" may then be provided, to provide visualizations of specific types of dates (e.g., creation date, URL last visited date, cookie expiry date, etc.). A timeline control (not shown) can be used to select the types of secondary timelines 424 to be displayed. For example, in some cases, secondary timelines 424 may be defined using filter input.

Each slice can be selected and used to perform a context switch as described elsewhere herein, to reveal a source location of the data artifact or data artifacts.

Figure 4G:
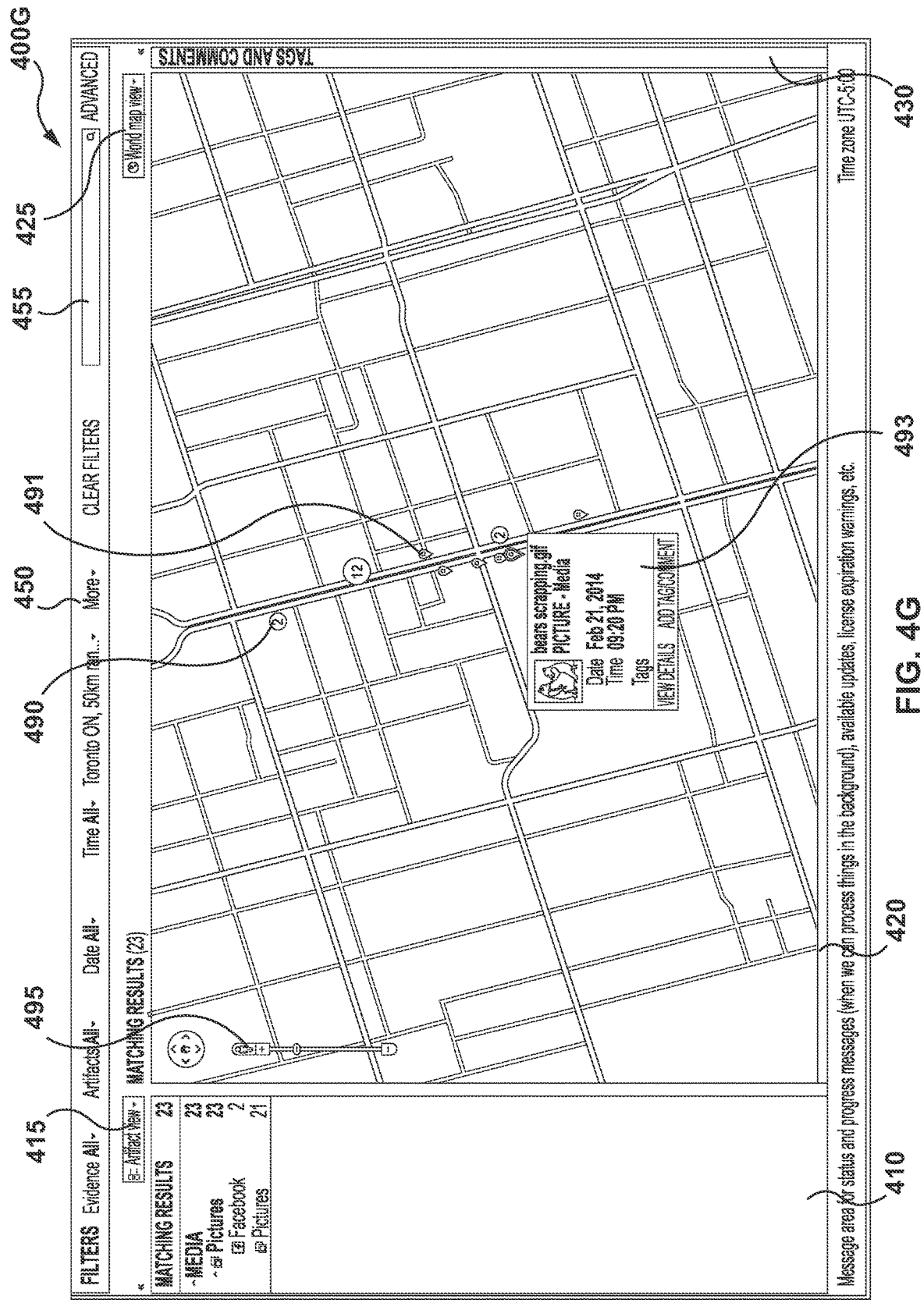
FIG. 4G is an example of a graphical user interface, with the main view in a map presentation format.

Referring now to FIG. 4G, there is shown an example of a graphical user interface, with the main view in a map presentation format. Graphical user interface 400G is one example embodiment of graphical user interface 300. The elements of FIG. 4G are numbered using reference numerals in the 400s, however unless otherwise noted these elements are generally analogous to those of similarly-numbered elements with reference numerals in the 300s, as shown in FIG. 3. For example, filter interface 450 is analogous to filter interface 350, navigation view 410 is analogous to navigation view 310, main view 420 is analogous to main view 320, and so on.

In graphical user interface 400G, main view 420 displays the map presentation format as indicated by selection input 425. The main view displays a geographic map, with pins 491 or clusters 490 placed on the geographic map according to location data associated with data artifacts. For example, if one data artifact is associated with a street address, or latitude/longitude, a pin 491 may be placed on the corresponding location on the map. A zoom control 495 may be provided, allowing the user to zoom into or out of the map. As the user zooms out, pins may be collapsed into clusters 490. Conversely, as the user zooms in, clusters 490 may be broken out into individual pins 491. Each cluster 490 may be labeled with a number representing the number of data artifacts within the cluster.

When a user hovers over a pin 491 or cluster 490, a dialog may be displayed containing attribute data corresponding to the data artifacts represented by pin 491 or cluster 490.

Each cell of the row detail presentation format corresponds to one data artifact, with attribute information relating to the artifact laid out in a table. Navigation view 410 is in an artifact view display type as indicated by selection input 415, with a media category and pictures subcategory selected. Accordingly, main view 420 is displaying data artifacts of the picture subcategory.

Each pin or cluster can be selected and used to perform a context switch as described elsewhere herein, to reveal a source location of the data artifact or data artifacts.

Figure 4H:
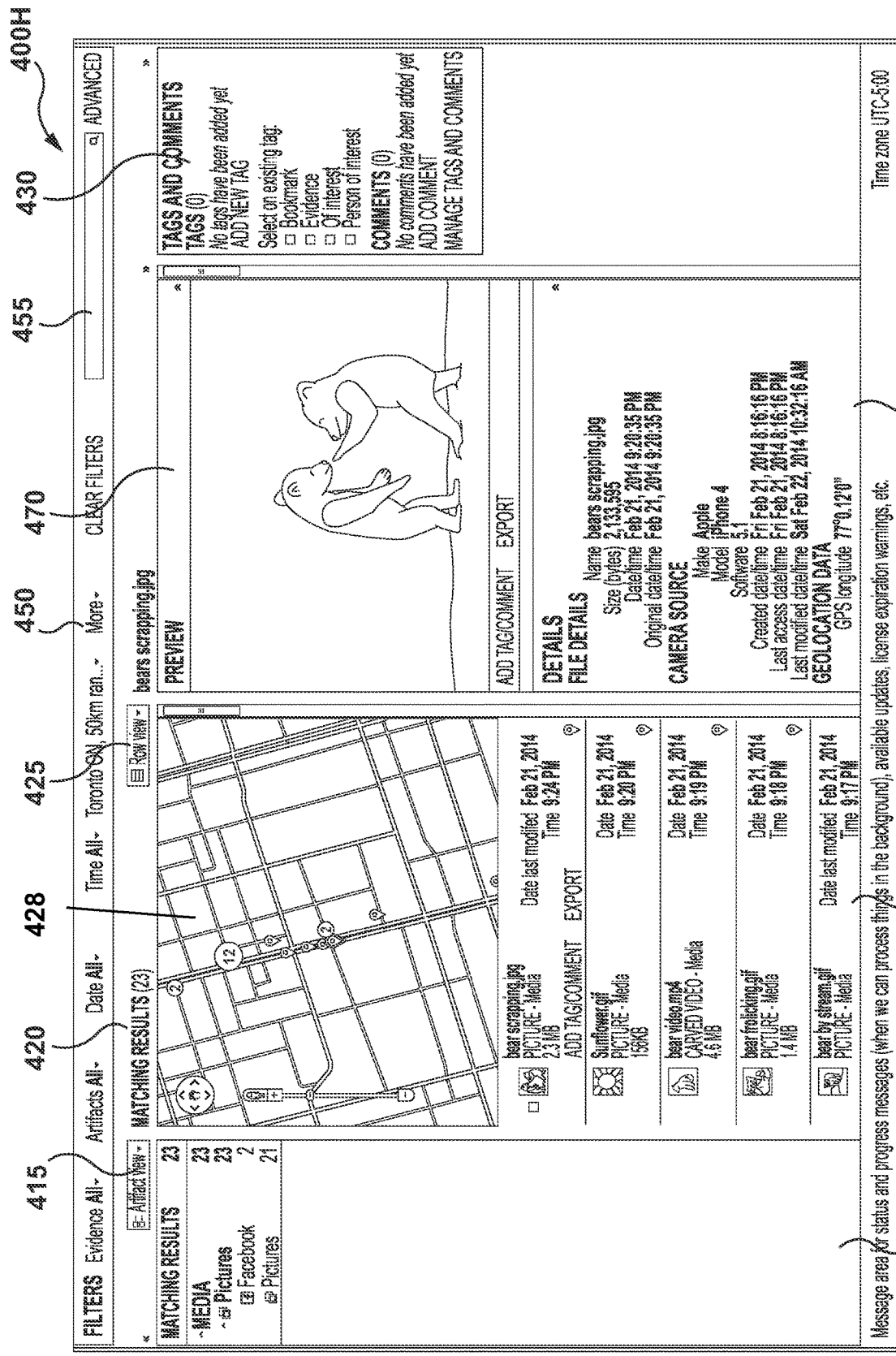
FIG. 4H is an example of a graphical user interface, with the main view in a combination map-row detail presentation format.

Referring now to FIG. 4H, there is shown an example of a graphical user interface, with the main view in a combination map-row detail presentation format. Graphical user interface 400C is one example embodiment of graphical user interface 300. The elements of FIG. 4H are numbered using reference numerals in the 400s, however unless otherwise noted these elements are generally analogous to those of similarly-numbered elements with reference numerals in the 300s, as shown in FIG. 3. For example, filter interface 450 is analogous to filter interface 350, navigation view 410 is analogous to navigation view 310, main view 420 is analogous to main view 320, and so on.

In graphical user interface 400H, main view 420 combines elements of the row detail presentation format as shown in FIG. 4C and the map presentation format as shown in FIG. 4G, displays the row detail presentation format as indicated by selection input 425. The main view 420 may be subdivided into a map area 428, which functions in similar fashion to main view 420 as shown in FIG. 4G, and a row detail area 429, which functions in similar fashion to main view 420 as shown in FIG. 4C.

As with the format of FIG. 4C, each cell of the row detail presentation format corresponds to one data artifact, with attribute information relating to the artifact laid out in a table. Navigation view 410 is in an artifact view display type as indicated by selection input 415, with a pictures category selected. Accordingly, both area 428 and 429 of main view 420 are displaying data artifacts of the pictures category.

Selection of one or more data artifacts in area 428 may cause the corresponding selection to be made in area 429, and vice versa. In general, the subdivision of main view 420 into multiple different presentation formats allows for easy visualization and selection of data artifacts by a user.

Each cell, pin or cluster can be selected and used to perform a context switch as described elsewhere herein, to reveal a source location of the data artifact or data artifacts.

In some other embodiments, main view 420 may be subdivided into other presentation formats. For example, a timeline presentation format may be shown in one subdivision and a row detail presentation format shown in another subdivision. Other combinations are also contemplated.

Figure 4I:
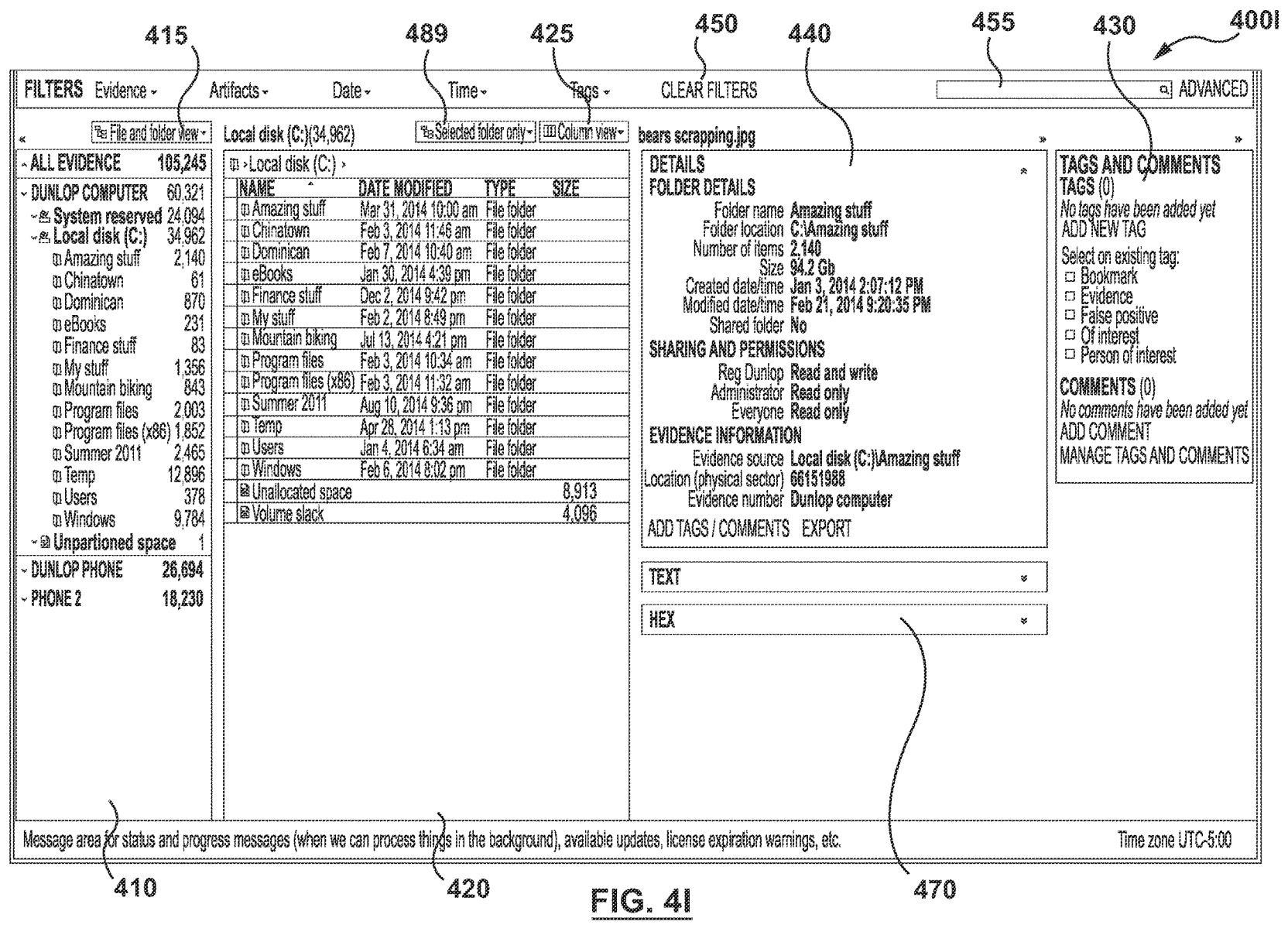

Referring now to FIG. 4I, there is shown an example of a graphical user interface, with the main view in a filesystem presentation format. Graphical user interface 400I is one example embodiment of graphical user interface 300. The elements of FIG. 4I are numbered using reference numerals in the 400s, however unless otherwise noted these elements are generally analogous to those of similarly-numbered elements with reference numerals in the 300s, as shown in FIG. 3. For example, filter interface 450 is analogous to filter interface 350, navigation view 410 is analogous to navigation view 310, main view 420 is analogous to main view 320, and so on.

In graphical user interface 400I, main view 420 displays the filesystem presentation format as indicated by selection input 425. Each row of the filesystem presentation format generally corresponds to a data item retrieved from a target device, with attribute information presented in columns. Data items relating to filesystem objects, information and constructs can be displayed, such as files and folders as found on a target device, deleted files, volume information, and the like. Navigation view 410 is in a filesystem view display type as indicated by selection input 415, with a "local disk" selected for a target device with the identifier "Dunlop Computer". Accordingly, main view 420 is displaying data items representing files and folders retrieved from the mass storage device of a target device. The displayed columns in FIG. 4I are therefore file or folder name, modification date and time, type and byte size (where applicable). Additional columns may be provided, if desired, for example to indicate file characteristics such as access permissions, owner, group, and the like. Filesystem presentation format may generally be analogous to column detail presentation format. For example, attributes for selected files or folders can be displayed in detail view 440.

Preview area 470 may be used to display previews for certain data artifacts, such as images for media files when selected. As with preview area 370, preview area 470 may also include a text view which displays text strings extracted from a selected file, or a hex view, which displays data in raw hexadecimal format for a selected file.

In general, the columns of main view 420 can be used to display attributes or metadata relating to each data item.

Each data item can be selected and used to perform a context switch as described elsewhere herein, to reveal data artifacts related to the data item.

Figure 4J:
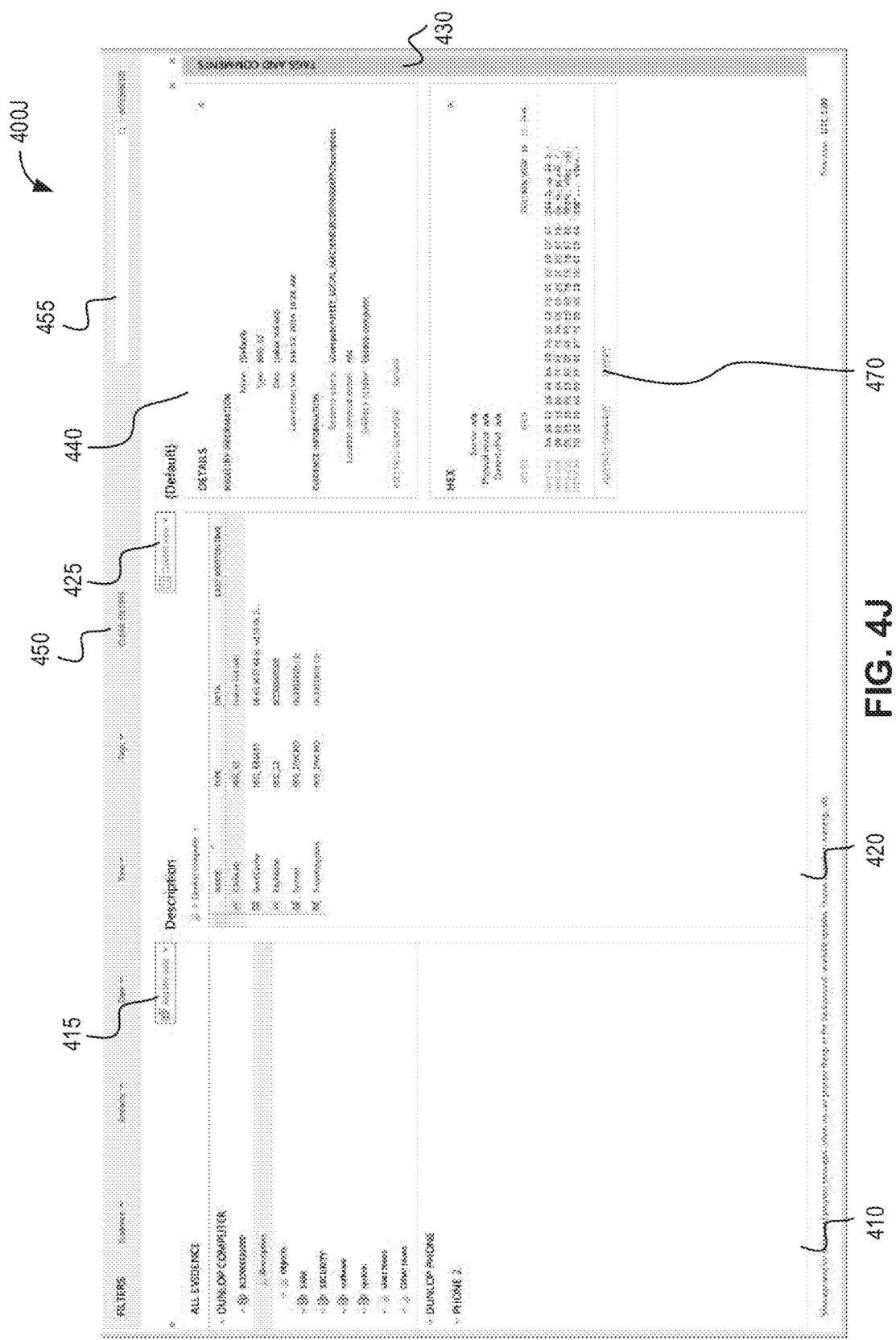
FIG. 4J is an example of a graphical user interface, with the main view in a registry presentation format.

Referring now to FIG. 4J, there is shown an example of a graphical user interface, with the main view in a registry presentation format. Graphical user interface 400J is one example embodiment of graphical user interface 300. The elements of FIG. 4J are numbered using reference numerals in the 400s, however unless otherwise noted these elements are generally analogous to those of similarly-numbered elements with reference numerals in the 300s, as shown in FIG. 3. For example, filter interface 450 is analogous to filter interface 350, navigation view 410 is analogous to navigation view 310, main view 420 is analogous to main view 320, and so on.

In graphical user interface 400J, main view 420 displays the registry presentation format as indicated by selection input 425. Each row of the registry presentation format corresponds to one registry setting retrieved from a target device, with attribute information and values presented in columns. Registry settings may also be considered data artifacts in some embodiments. Navigation view 410 is in registry view display type as indicated by selection input 415, displaying a hierarchical registry tree. Accordingly, main view 420 is displaying registry settings retrieved from the target device. The displayed columns in main view 420 are therefore setting name, setting type, data and modification date and time. Additional columns may be provided, if desired. Registry presentation format may be analogous in operation to column detail presentation format. For example, detailed attributes for selected settings can be displayed in detail view 440.

Preview area 470 may be used to display a hex view, which displays registry data in raw hexadecimal format for a selected key or hive.

Each row of main view 420 can be selected and used to perform a context switch as described elsewhere herein, to reveal a data artifact or data artifacts related to the selected setting.

Figure 4K:
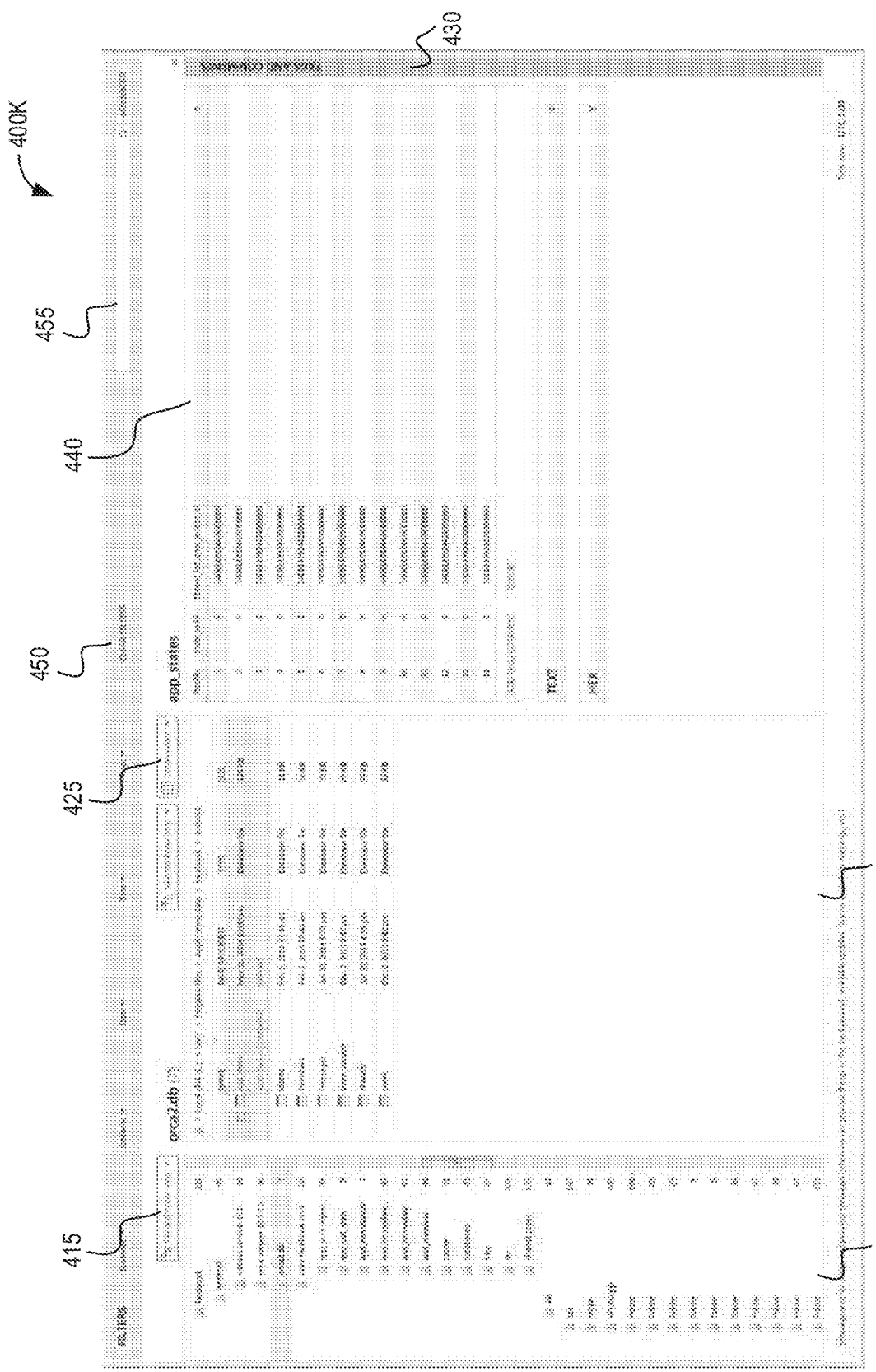
FIG. 4K is an example of a graphical user interface, with the main view in a database presentation format.
Figure 4L:
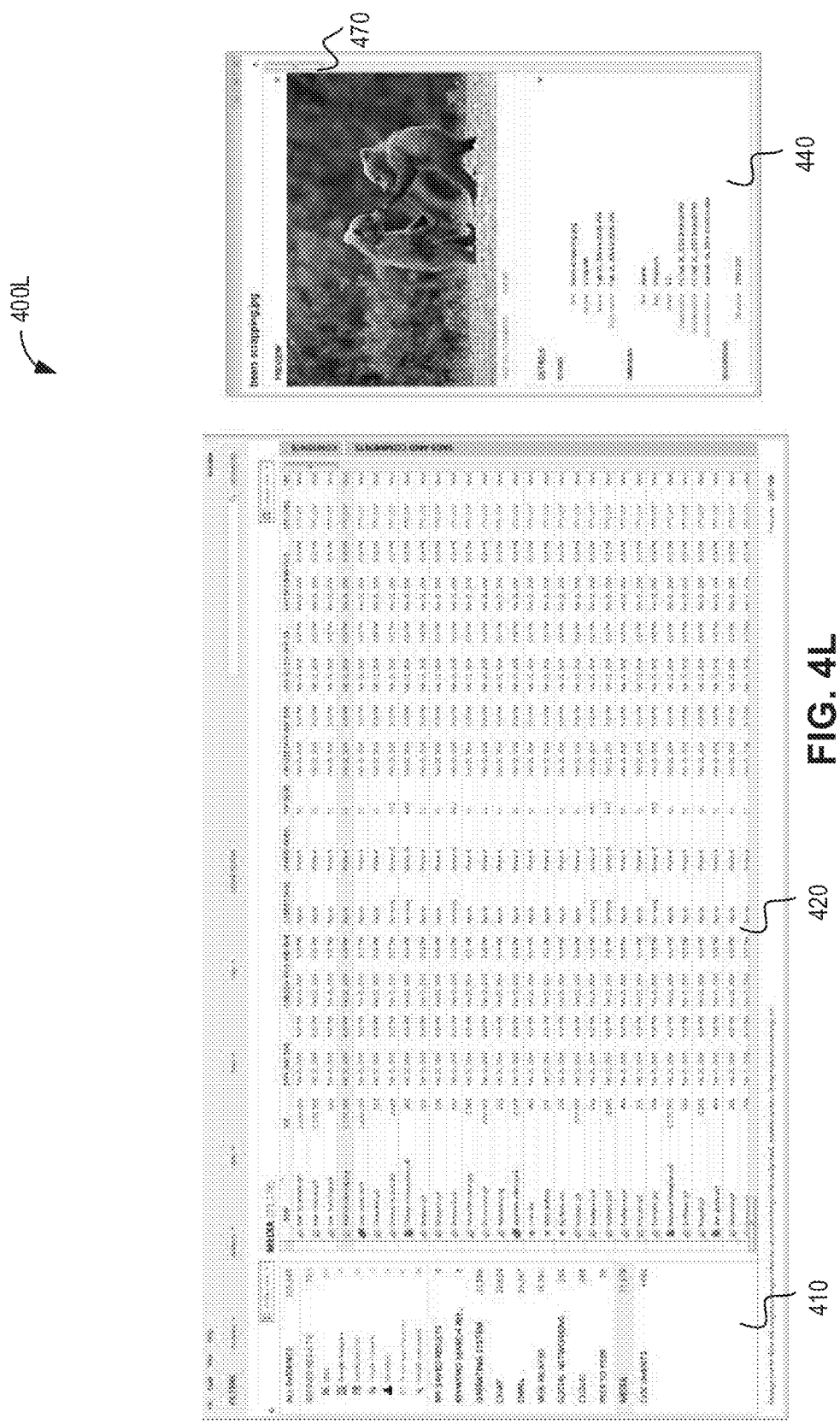
FIG. 4L is an example of a graphical user interface, with some elements displayed in a popout window.

Referring now to FIG. 4K, there is shown an example of a graphical user interface, with the main view in a database presentation format. Graphical user interface 400K is one example embodiment of graphical user interface 300. The elements of FIG. 4K are numbered using reference numerals in the 400s, however unless otherwise noted these elements are generally analogous to those of similarly-numbered elements with reference numerals in the 300s, as shown in FIG. 3. For example, filter interface 450 is analogous to filter interface 350, navigation view 410 is analogous to navigation view 310, main view 420 is analogous to main view 320, and so on.

In graphical user interface 400K, main view 420 displays the database presentation format as indicated by selection input 425. The database presentation format may be used to display database information generally. In particular, the database presentation format may be used to reveal information underlying data artifacts representative of database structures. For example, some chat service clients store message history and user information in a database store, which may contain multiple tables. The chat service client may construct each discrete message by querying the database, to pull information from multiple tables. In various other presentation formats, viewer computer may display data artifacts as a discrete entity, however the user may request a context switch to reveal the underlying database tables and records used to construct the selected data artifact. The context switch can be requested, for example, using a contextual dialog, a user interface element such as a button, or a link displayed in detail view 440.

When the database presentation format is enabled in main view 420, navigation view 410 may switch to the filesystem display type, revealing the relevant database files. Each row of the database presentation format can correspond to a table. Detail view 440 may display records of the table selected in main view 420. Database presentation format may be analogous in operation to column detail presentation format, for example, with columns provided for modification date, size, type and the like.

Preview area 470 may be used to display a hex view, which displays database data in raw hexadecimal format for a selected record.

Figure 5:
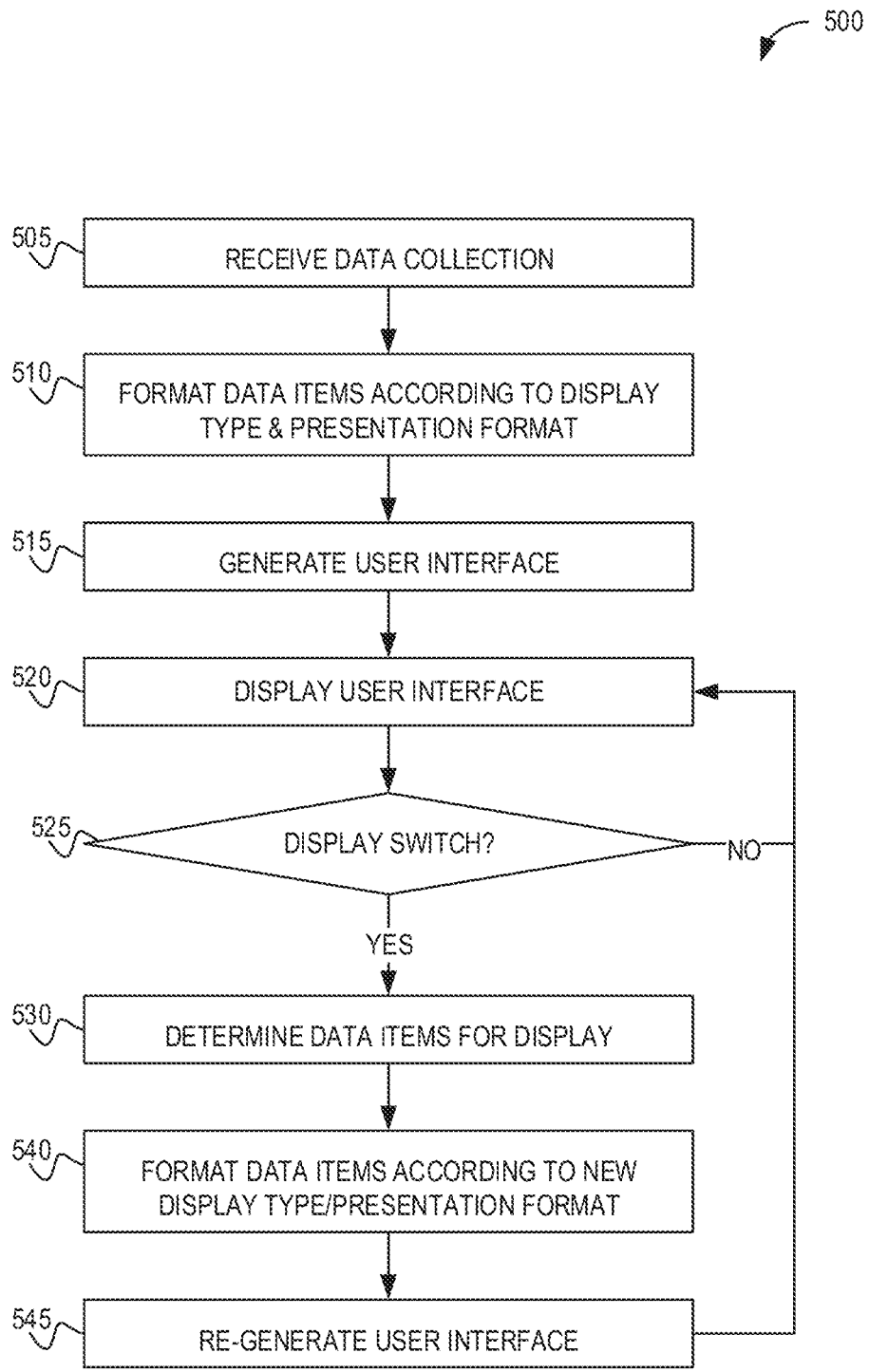
FIG. 5 is an example process flow in accordance with some example embodiments.

Referring now to FIG. 5, there is shown an example process flow in accordance with some example embodiments. Method 500 may be carried out, for example, using a viewer computer 110 or 210 executing a forensic data investigation application provided to the viewer computer and stored thereon. The forensic data investigation application contains executable instructions for manipulating data according to method 500 and thereby generating and displaying a graphical user interface such as graphical user interface 300 or graphical user interfaces 400A to 400J.

Method 500 begins at 505, with the viewer computer receiving a data collection containing data items. The data collection may be an image file or an electronic database file stored in a data storage device 130 as described herein. A data collection may contain data items retrieved from more than one target device. In such cases, each data item in the data collection may be tagged with information to identify the target device that is the source of the data item. Likewise, the data collection may contain data artifacts generated based on one or more other data items. In some cases, the data collection may contain a plurality of ontological sets and data regarding their respective relationships, as described further herein.

At 510, viewer computer formats the plurality of data items according to a first display type and first presentation format to generate a plurality of displayed data items. The graphical user interface is generated at 515 and displayed at 520, e.g., using output device 250 of viewer computer 210.

The data artifacts can be displayed, for example, in a main view 320 or 420, with navigation data displayed in a navigation view 310 or 410 as described herein. The display type may be, for example, an artifact view display type, a filesystem display type or a registry view display type. The presentation format may be, for example, a column detail presentation format, or any other presentation format described herein.

Method 500 may enter into an idle loop and wait for further events, such as key presses or pointer input.

At 525, a display switch may be detected. A display switch may occur, for example, when the user selects selection input 315, selection input 325 or a context switch command.

Operation of selection input 315 causes the viewer computer to switch from one display type to another display type in navigation view 310. Similarly, operation of selection input 325 causes the viewer computer to switch from one presentation format to another presentation format in main view 320. In some cases, a change to display type may automatically cause a change to presentation format, or vice versa.

A context switch command instructs the viewer computer to switch from one display type or presentation format to another display type or presentation format, or vice versa, based on one or more currently selected data item. For example, if the graphical user interface is currently displaying an artifact view display type and a chat thread presentation format, with a chat artifact selected, the context switch may cause a switch to a filesystem display type and filesystem presentation format, with a corresponding file data item selected. Similarly, if the navigation view is in the filesystem display type and the main view is in the filesystem presentation format, the user may select a file or folder data item and enter a context switch command. The viewer computer identifies the selected data items (representing file or folder), then determines related data artifacts. For example, if the data item is a photo file, viewer computer may identify a data artifact corresponding to the photo for display in main view 320 in the new presentation format. In some cases, the viewer computer may also identify other data artifacts with related attributes, such as photo artifacts with a similar date or time (e.g., within a predefined time range), a similar location (e.g., within a predefined distance of the location data in the selected photo), or a similar folder (e.g., shared with the selected photo). In another example, if the data item is a chat message file, viewer computer may identify a corresponding chat artifact, and optionally other chat messages with related attributes, such as a similar date or time. Selection of the context switch command may cause the navigation view display type and main view presentation format to change accordingly. For example, when identifying photo artifacts, the navigation view may change to an artifact view display type and the main view may change to a thumbnail presentation format or other presentation format that the user may predefine.

Context switches can be performed between various display types and presentation formats. For example, a context switch can be performed from a registry display type and presentation format to filesystem display type and presentation format. Similarly, a context switch can be performed from a database display type and presentation format to filesystem display type and presentation format or to an artifact view display type and column detail presentation format (for example). Various other combinations may be performed.

A context switch can be performed bi-directionally. For example, if the navigation view is instead in an artifact view display type and main view is in, for example, a column detail presentation format, the user may select a data artifact and enter a context switch command. In this context, the viewer computer identifies the selected data artifact, determines a data item corresponding to a source file or folder of the data artifact, then changes the navigation view and main view into filesystem display type and filesystem presentation format, respectively, to display the data items representing the source file or folder of the previously selected data artifact, together with other data items in the source folder (if any).

A context switch may be input to viewer computer, for example, by the user selecting one or more data item or artifact and providing a contextual command such as, for example, right-clicking and selecting a context switch option. In other examples, a context switch input may be displayed in a graphical user interface at all times, or in detail view 340 in the form of a clickable element for example.

If the display switch is a context switch, then at 530 the viewer computer can determine at least one related data item associated with the selected data item, for display in the graphical user interface.

At 540, the viewer computer formats the selected data item and the at least one related data item according to a selected presentation format, which may be chosen based on the selected data item. In the case of a context switch, the selected presentation format can based on the first display type or the main view presentation format, or both. The display type may also change. For example, if the first display type was a filesystem display type (or the main view presentation format was a filesystem presentation format), then the second display type may be an artifact view display type, and vice versa. Generally, when the first presentation format is an artifact presentation type, such as column detail, row detail, thumbnail, chat thread or map presentation format, the second presentation format can be a filesystem presentation format (e.g., to reveal the source folder location of the selected artifact).

In the case where the display switch is due to selection of selection input 315 or selection input 325, viewer computer may simply select the new display type or presentation format without regard to the selected data items if those data items can be displayed in the new display type or presentation format. Generally, viewer computer can attempt to maintain the previous selection within the navigation view or main view after the display switch.

At 545, the graphical user interface is regenerated and then the refreshed graphical user interface is displayed again at 520.

Figure 6A:
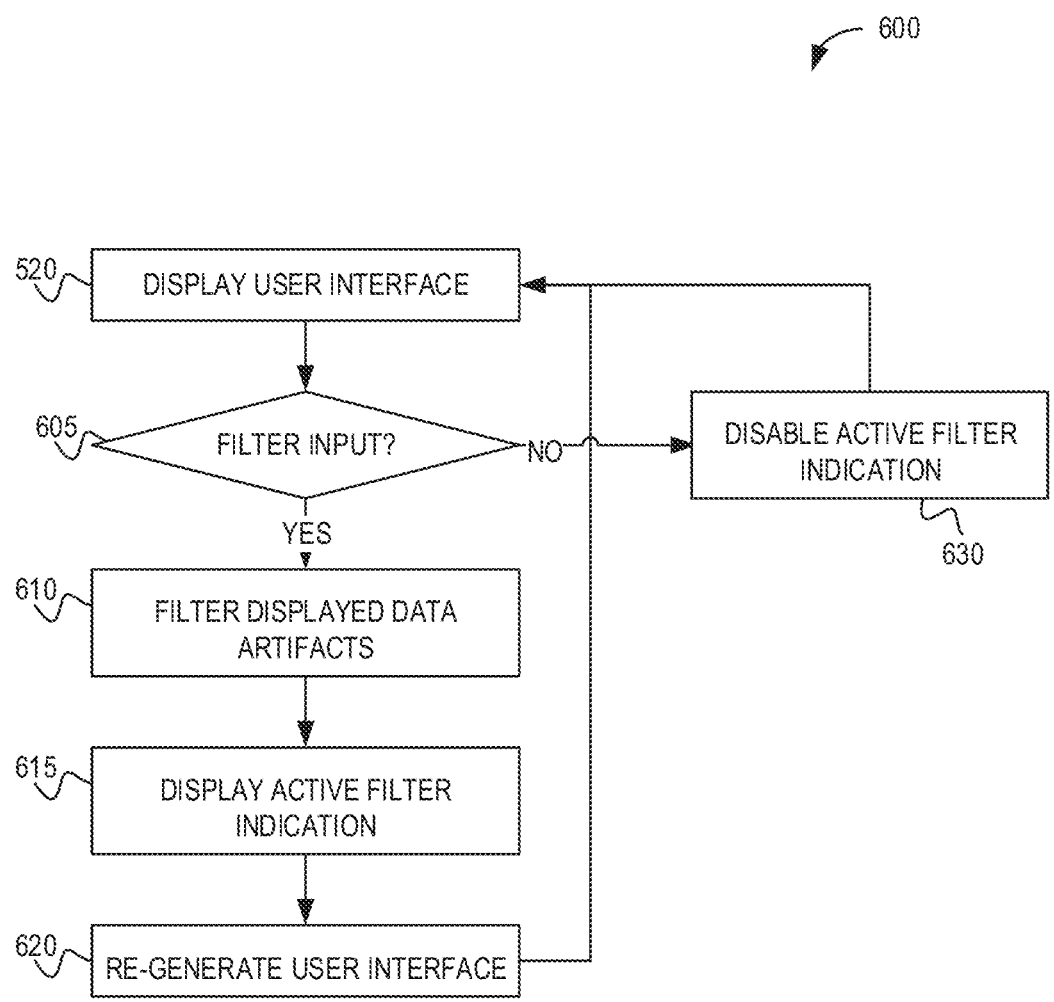
FIG. 6A is an example filter process flow in accordance with some example embodiments.

Referring now to FIG. 6A, there is shown an example filter process flow in accordance with some example embodiments. Method 600 may be carried out, for example, in conjunction with method 500 of FIG. 5 and using a viewer computer 110 or 210 executing a forensic data investigation application provided to the viewer computer and stored thereon.

Method 600 begins with display of a graphical user interface as at 520 of method 500. A user may wish to filter the display, for example, due to a large number of data items being displayed in main view 320 or 420.

At 605, the viewer computer determines that at least one filter has been applied and regenerates the main view to display only those data items that satisfy the filter criteria. The applied filter may be implicit, contextual or applied via filter interface 350.

At 610, the filter interface (e.g., filter interface 350 or 450) may be provided with an active filter indication, for example by shading the filter interface with a different color, by providing an icon, or by emphasizing text in the filter interface. In some cases, an implicit filter applied via navigation view 310 may be indicated via shading of the corresponding artifact category or subcategory.

The graphical user interface is regenerated at 620 and re-displayed at 520.

If, at 605, the viewer computer determines that a filter has been removed, the acts of method 600 may be reversed and previously filtered data items may be re-displayed. If no other filters are applied, the main view may be regenerated to display all data items once again, the active filter indication may be disabled at 630 and the graphical user interface regenerated and redisplayed.

Figure 6B:
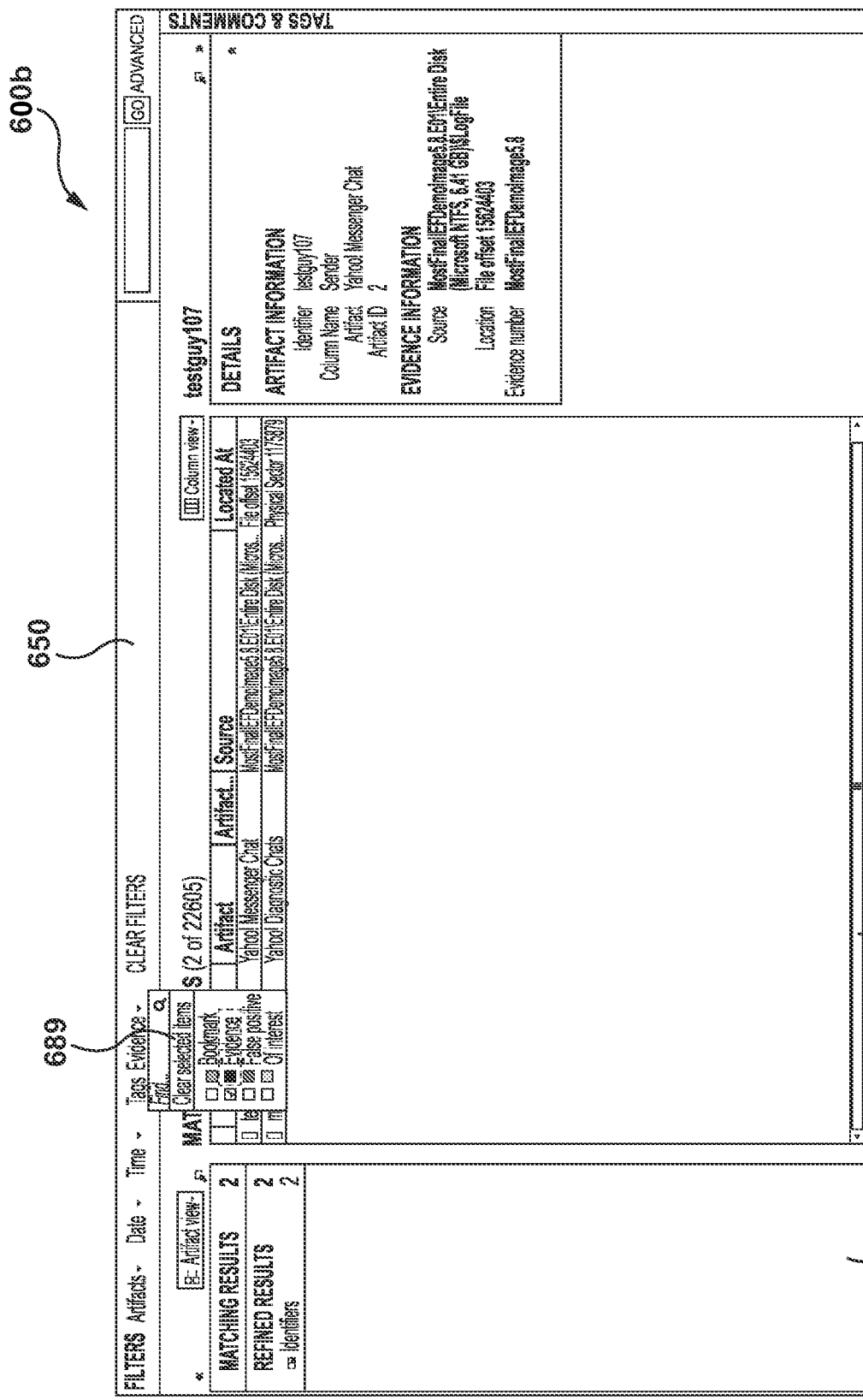
FIG. 6B is an example of a graphical user interface, with a filter applied via a filter dialog.

Referring now to FIG. 6B, there is shown an example of a graphical user interface, with a filter applied via a filter dialog 689 of the filter interface 650. Graphical user interface 600b is one example embodiment of graphical user interface 300. The elements of FIG. 6B are numbered using reference numerals in the 600s, however unless otherwise noted these elements are generally analogous to those of similarly-numbered elements with reference numerals in the 300s, as shown in FIG. 3. For example, filter interface 650 is analogous to filter interface 350, navigation view 610 is analogous to navigation view 310, main view 620 is analogous to main view 320, and so on.

Filter interface 650 is shaded to provide the active filter indication as described with respect to FIG. 6A. Since the filter criteria provided in filter dialog 689 is for data items with an "Evidence" tag, the data items displayed in main view 620 are those which have the "Evidence" tag applied. Optionally, an indication (e.g., color shading) may be provided in the row detail or column detail presentation format to indicate that a tag is applied to the data item.

Figure 7:
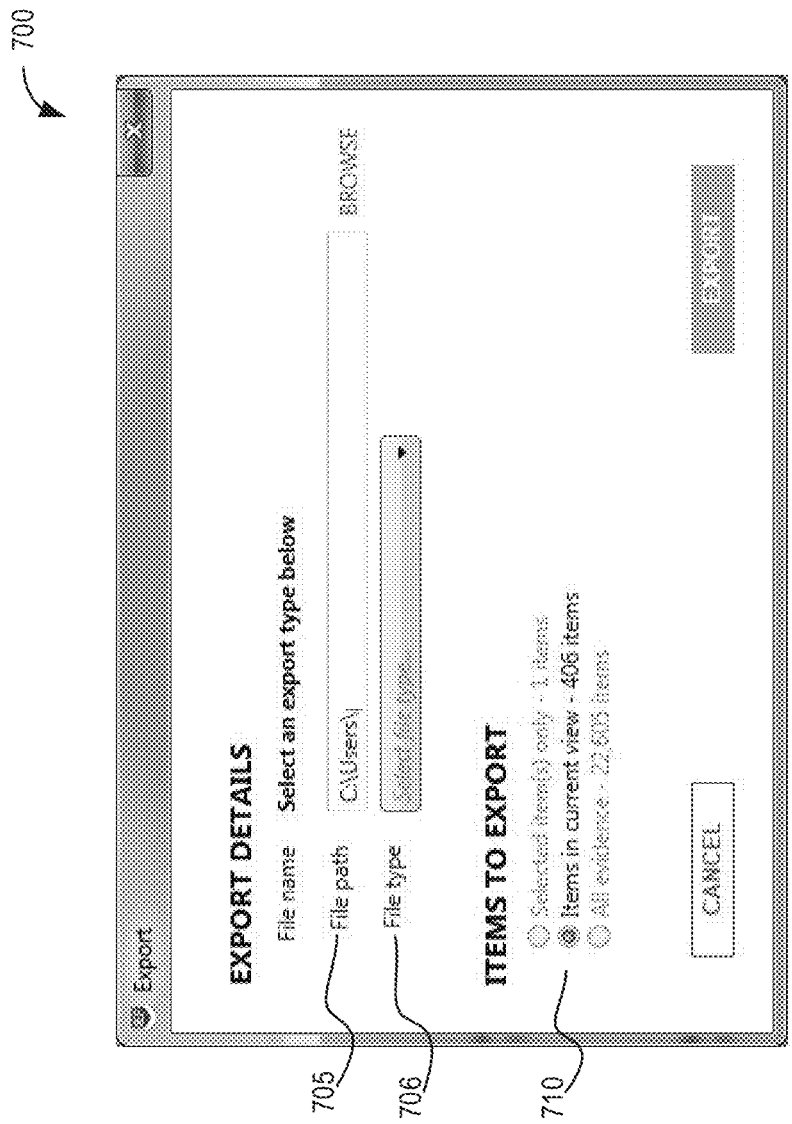
FIG. 7 is an example of a graphical user interface element for report generation.

Referring now to FIG. 7, there is shown an example of a graphical user interface element for report generation. A viewer computer may execute a report generation method, for example, by receiving a report command via a report element of the user interface, generating a report based at least one of the plurality of displayed data items (e.g., in main view 320 or 420) and storing the report in a storage device of the viewer computer. Optionally or alternatively, the report may be transmitted electronically to another device, or displayed to the user in a graphical user interface.

Graphical user interface element 700 can contain an input control 705 for selecting the name of the report and the location where it is to be stored. Graphical user interface element 700 may also provide a report type selection 706 for selecting a type of report such as, for example, Portable Document Format (PDF), Microsoft Word™ or other formats.

Graphical user interface element 700 may also enable the user to specify the data items to be included in the report using a selection input 710, which may be, for example, a radio button control. For example, the user may select to include only those data items that were selected prior to receiving a report command, all data items in the current main view of the graphical user interface 300 or 400A to 400J, or all data items within a current data collection.

When the user is satisfied with the report options, the viewer computer can generate the report. The generated report can contain data relating to the data items selected for inclusion in the report, including various attributes. Depending on the type of data items (or data artifacts), the report format may be altered to display the attributes in a relevant fashion. Likewise, data items may be ordered in the report according to the selected order within main view 320 and, in some cases, using the same presentation format as in main view 320. In this manner, a user of the viewer computer can easily produce a report that replicates the data viewable within a graphical user interface such as graphical user interface 300 or 400A to 400J. This can relieve the user of the substantial burden of report preparation for the purposes of evidence submission, where data items must be meticulously documented and catalogued, and where data artifacts must be pieced together from various data items.

As described above, reports can be generated based on a "what you see is what you get" model. For example, reports may adopt a presentation format similar to that displayed in the graphical user interface. Likewise, reports may contain data items corresponding to those currently selected for display in the graphical user interface, in particular based on applied filters (whether implicit or explicit). The viewer computer may automatically generate and report relevant attributes (such as date and time, filesystem location, etc.) according to the columns or attributes displayed in main view 320 or 420.

In particular, viewer computer can generate reports to reflect the filtering, column order, sorting and visibility as selected by the user in the graphical user interface. For example, if a user has selected an artifact view display type with a media category, and a column detail presentation format, then subsequently hidden a software version column in the main view, then viewer computer can map the various user interface elements to the generated report elements, such that the generated report can display only media artifacts, with the software version column omitted.

Figure 8A:
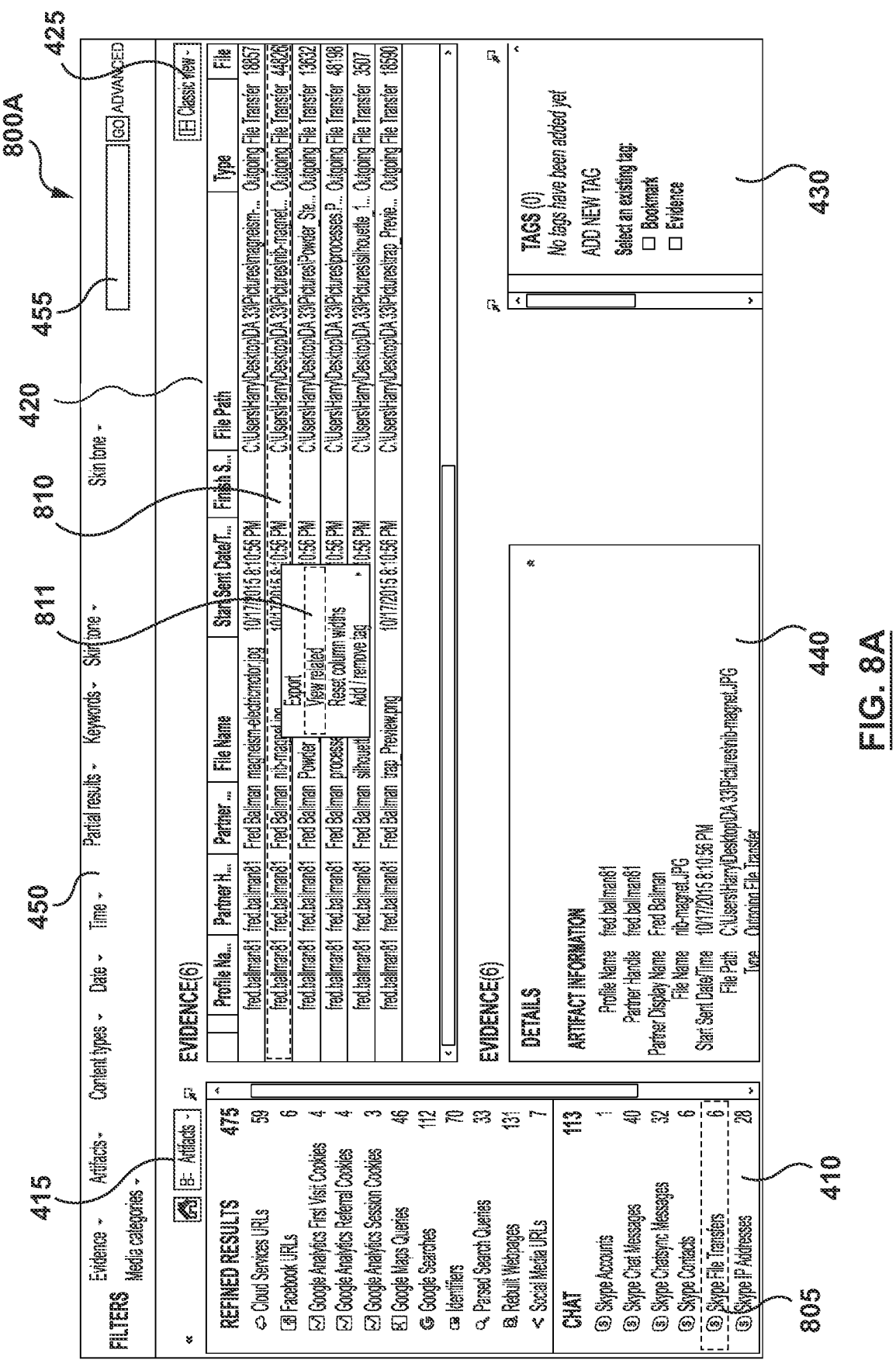
FIG. 8A is an example of another graphical user interface, with the main view in a column detail presentation format.

Referring now to FIG. 8A, there is shown an example of a graphical user interface, with the main view in a column detail presentation format. Graphical user interface 800A is yet another example embodiment of graphical user interface 300. The elements of FIG. 8A are generally numbered using reference numerals in the 400s, however unless otherwise noted these elements are generally analogous to those of similarly-numbered elements with reference numerals in the 300s, as shown in FIG. 3. For example, filter interface 450 is analogous to filter interface 350, navigation view 410 is analogous to navigation view 310, main view 420 is analogous to main view 320, and so on.

In graphical user interface 800A, main view 420 displays the column detail presentation format as indicated by selection input 425 (in this example the column detail presentation format is labelled as "Classic view"). Each row of the column detail presentation format corresponds to one data item, and each column of the column detail presentation format displays an attribute for each data item. Navigation view 410 is shown in an artifact view display type as indicated by selection input 415, with a chat category selected. Accordingly, main view 420 is displaying data artifacts of the chat category and of the "Skype File Transfers" subcategory, as indicated by selection indicator 805. The displayed columns in FIG. 8A are therefore profile name, profile handle, partner display name, file name, start sent date/time, finish sent date/time, file path, and type. Additional columns are obscured due to the size of main view 420, but can be viewed by scrolling right.

In some cases, a column heading may be used to define a filter and, in particular, a contextual filter. For example, a user may transmit a command to define a contextual filter by option-clicking or right-clicking on a column heading. Viewer computer may determine the type of data contained in the column, and provide a contextual control to allow the user to define filter criteria specific to the column. In one example, if the column contains date data, the contextual control may accept a start date and an end date. In another example, if the column contains numerical data, the context control may accept a lower bound and an upper bound. In general, a contextual filter can also be used to limit the display only to those data items with attributes belonging in a particular column.

In some cases, the columns presented in column detail presentation format may be context sensitive. For example, when navigation view 410 is in an artifact view display type, the selection of different artifact categories in navigation view 410 may cause the columns in main view 420 to be altered. For example, if data artifacts belonging to a chat category are displayed, one column of main view 420 may indicate attributes specific to chat artifacts, such as the type of chat (e.g., Yahoo!™, ICQ™, etc.), message sent date, etc. Similarly, when data artifacts belonging to an e-mail category are selected, the columns of main view 420 may display attributes specific to e-mail, such as the sender, recipient, subject, sent date and various other fields. When data artifacts belong to a photo media category are selected, the columns of main view 420 may display attributes specific to media, such location data (if available), camera make and model, image size, and other image metadata. However, in some cases, data artifacts of multiple categories can be displayed together in main view 420 (e.g., when the "all evidence" category is selected).

In general, the columns of main view 420 can be used to display attributes or metadata relating to each data item.

Graphical user interface 800A also displays a detail view 440, which provides additional detail for one or more selected item in main view 420. In this example, the details shown are associated with the selected artifact indicated by selection indicator 810. An annotation view 430 is also displayed.

Items in the main view 420 can be selected, and a contextual menu 811 displayed upon receipt of an input from the user. The contextual menu 811 can display a number of command options, including a relation command (in this example labelled "View related"). When selected, the relation command causes the graphical user interface to display data items that are related to the selected data item. Accordingly, the main view may change to a row detail presentation format or column detail presentation format or other format, as appropriate. However, in some cases, the relation command may cause a relation graph presentation format to be displayed, as described further herein.

The relation command can also be selected, in some cases, when main view 420 is in other presentation format, such as a filesystem presentation format for example. In such cases, the viewer computer may first attempt to determine artifacts relevant to the selected file or folder, registry entry, geographic location, as may be, and form the first ontological set from the relevant artifacts that are identified.

Figure 8B:
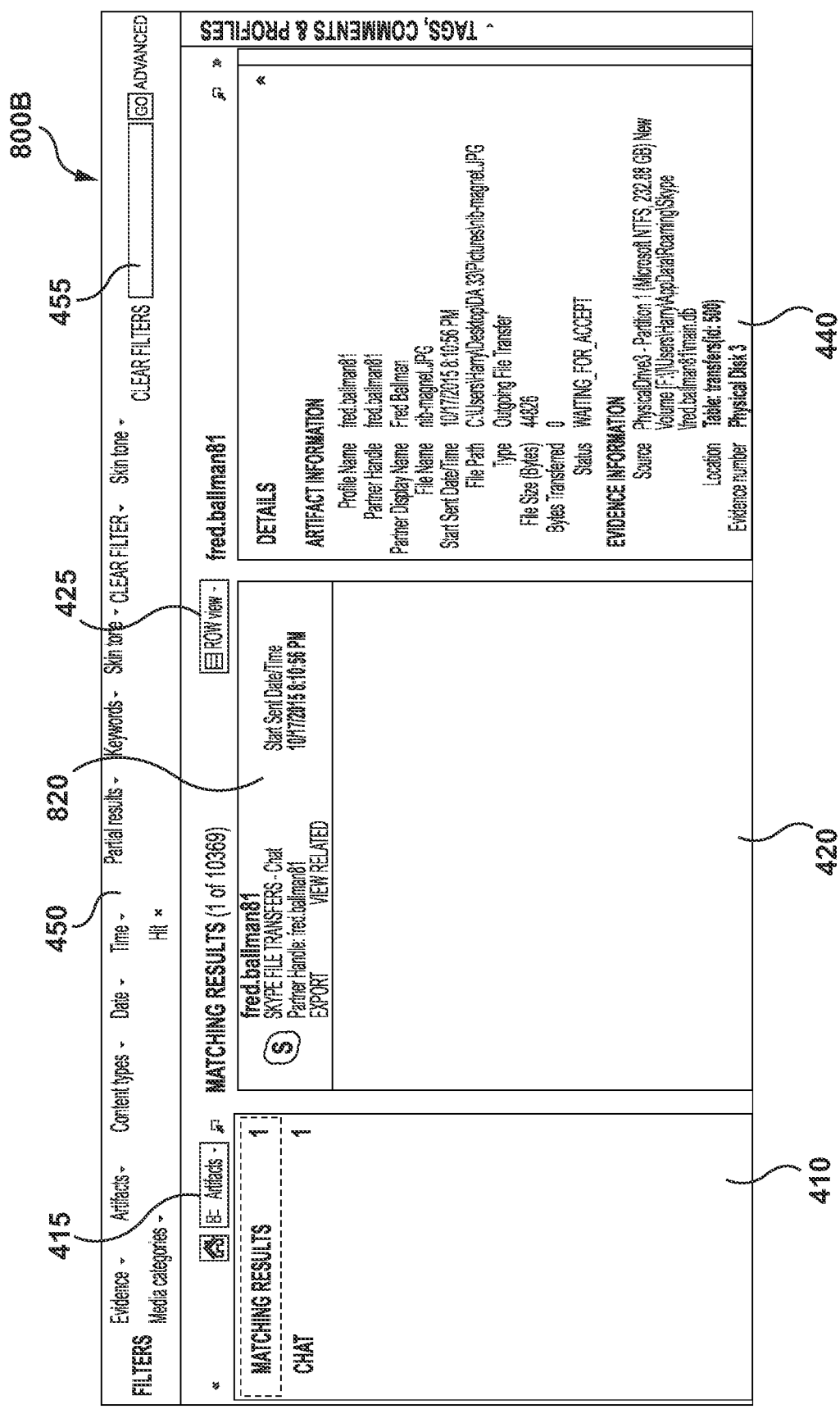
FIG. 8B is an example of another graphical user interface, with the main view in a row detail presentation format.

Referring now to FIG. 8B, there is shown an example of a graphical user interface, with the main view in a row detail presentation format. Graphical user interface 800B is displayed upon receipt of the relation command to display related data items. The presentation format has been changed to row detail presentation format, and other elements have been repositioned, collapsed or resized.

Main view 420 displays the first ontological set, which in this case contains one artifact that was shown as selected in graphical user interface 800A. In this case, there are no other artifacts in the first ontological set to display. Accordingly, following the relation command, only the artifact shown selected by selection indicator 820, is displayed. Details of the selected artifact are shown in detail view 440. In other cases, had the relation command been used when a file was selected in a filesystem presentation format, the first ontological set may have included additional artifacts, which would then be shown in main view 420.

In some cases, the user may wish for related ontological sets to be identified and displayed, based on some commonality with the first ontological set. To display additional related sets, a user may select the selection input 425 and select a relation graph presentation format.

Figure 8C:
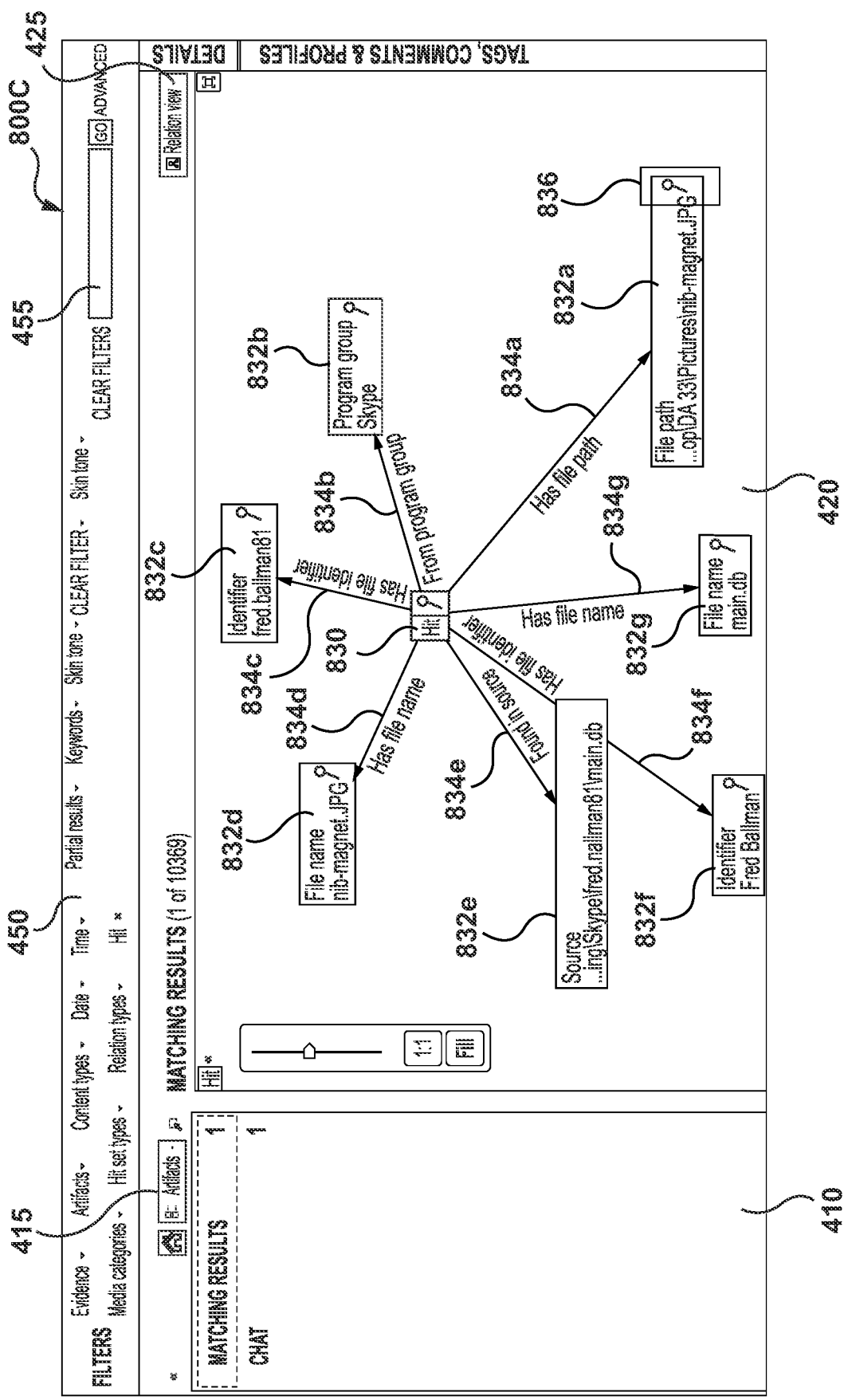
FIG. 8C is an example of another graphical user interface, with the main view in a relation graph presentation format.

Referring now to FIG. 8C, there is shown an example of a graphical user interface, with the main view 420 in a relation graph presentation format. Graphical user interface 800C can be displayed upon receipt of the selection input to transition to relation graph presentation format.

Navigation view 410 is in an artifact display type, showing matching artifacts from the first ontological set.

The relation graph presentation format displays a directed graph view, which is initially centered on a first ontological set 830 that includes the first artifact. This central node can be referred to as a 'hit' and serves as the starting point for the graph display.

The relation graph presentation format can also include a plurality of ontological sets, depicted as nodes 832*a* to 832*g*, to which the first artifact is related. Each of the plurality of ontological sets 832*a* to 832*g* (or, rather, their respective nodes) is connected to the node 830 of the first ontological set with respective edges, which have respective labels. The edges can have arrows to illustrate the nature of the relationship between the first ontological set and the respective ontological set.

For example, first ontological set 830 is connected to ontological set 832*d* by edge 834*d*. This connection illustrates an ontological relationship in which the first ontological set is the subject, "has file name" is the predicate, and the ontological set associated with node 832*d* is the object. The ontological set 832*d* specifically contains artifacts that share a "file name" attribute with a value of "nib-magnet.JPG". Accordingly, the edge connecting first ontological set 830 to ontological set 832*d* indicates that first ontological set 830 has an artifact with the file name "nib-magnet.JPG" as an attribute.

In some embodiments, indirect or inferred relationships may also be determined and displayed. An inferred relationship may be determined where an ontological set is related to another ontological set by way of an intermediate ontological set. For example, set A is related to set B, and set B is related to set C, but set A is not directly related to set C. In such cases, set A is indirectly related to set C, and an inferred relationship can be established. Such inferred relationships may, in some cases, be displayed connected by edges. The edges for inferred relationships can be distinguishable from edges for direct relationships, for example by different shading or dashing.

Ontological set 832*d* may have as members one or more other artifacts that also share the "file name" attribute with the value of "nig-magnet.JPG".

Various other relationships can be depicted in analogous fashion. For example, first artifact 830 is "From program group" "Skype", as indicated by the connection to ontological set 832*b*.

Ontological sets 832*a* to 832*g*, along with edges 834*a* to 834*g* can be interacted with via the graphical user interface, as described herein. For example, each node may be repositioned. Nodes may also be removed, for example by the user selecting the node and using a contextual menu, or a delete key, or the like.

Each node in the graph also has a pin 836 associated therewith. The pin can be enabled via the user interface using a pinning command (e.g., clicking the pin) to fix the node on the display, such that subsequent acts do not serve to remove the associated node from the display.

Similarly, in some cases, each visited node can be added to a visited collection, which remains displayed following successive activation selections. For example, the first ontological set and each user selected set can be added to the visited collection.

Figure 8D:
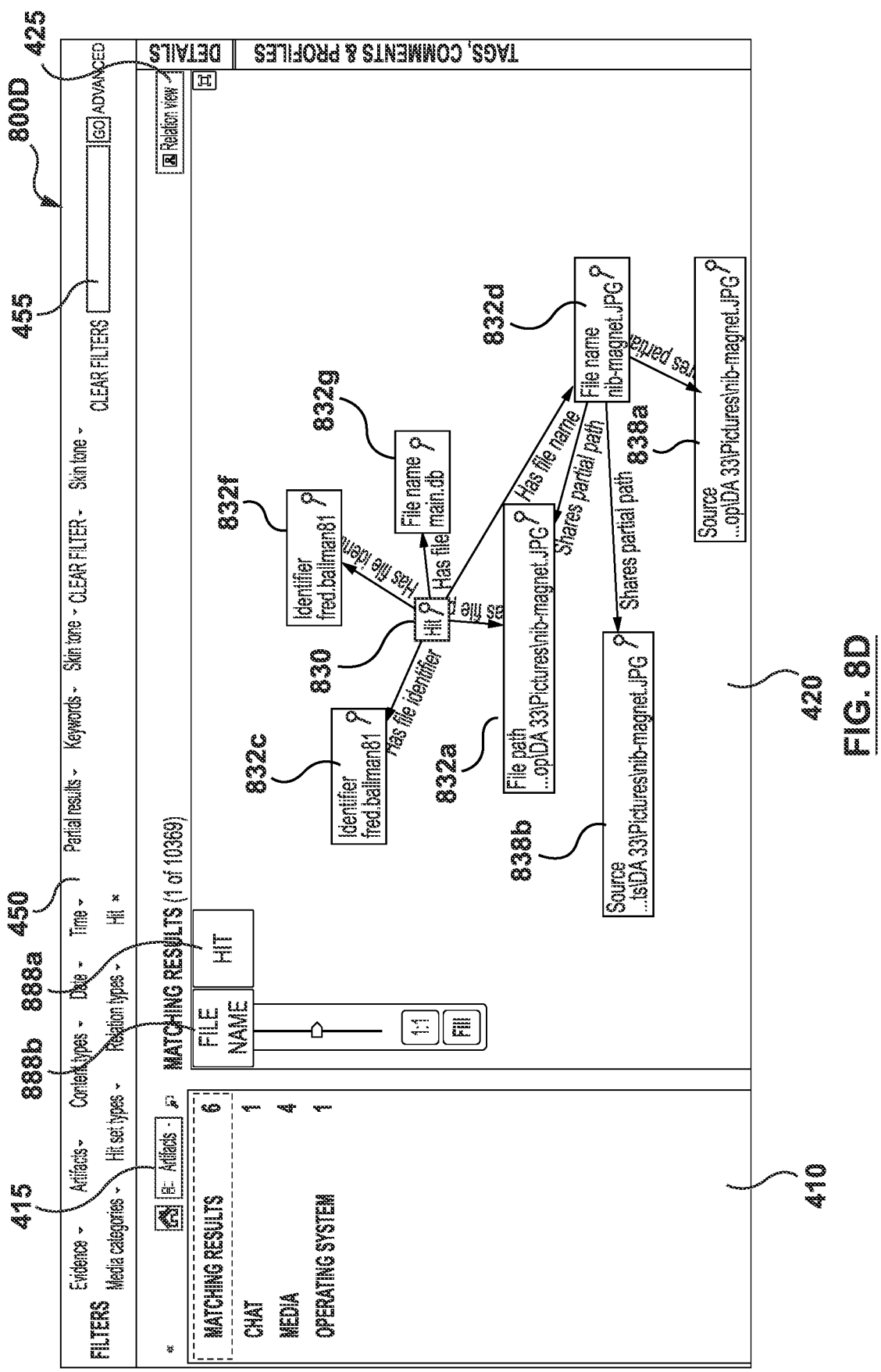
FIG. 8D is an example of another graphical user interface, with the main view in a relation graph presentation format.

Referring now to FIG. 8D, there is shown an example of a graphical user interface, with the main view 420 in a relation graph presentation format. Graphical user interface 800D can be displayed upon receipt of an activation selection of an ontological set while in the relation graph presentation format.

In graphical user interface 800D, ontological set 832*d* has received the activation selection, and new ontological sets 838*a* and 838*b* are displayed with respective edges depicting the relationship to ontological set 832*d*.

Each respective edge connecting ontological set 832*d* to ontological set 838*a* or 838*b* is indicative of a relationship between ontological set 832*d* and ontological set 838*a* or 838*b*. Accordingly, at least one artifact (subject) in ontological set 832*d* shares a file path with (predicate) at least one artifact (object) in ontological set 838*a*.

As shown in graphical user interface 800D, first ontological set 830 and ontological sets 832*a*, 832*c*, 832*f* and 832*g* have been pinned, and therefore remain on display following the activation selection. However, ontological sets 832*b* and 832*e*—which were not pinned—have been removed from display.

In graphical user interface 800D, various nodes have been repositioned relative to graphical user interface 800C. However, in some embodiments, the placement of nodes may be retained when displaying or removing nodes.

Graphical user interface 800D may also contain one or more breadcrumb icons 888*a*, 888*b* and so on corresponding to members of the visited collection. Each breadcrumb icon has a label illustrating the incremental activation selections that have led to the current relation graph displayed in main view 420. For example, in graphical user interface 800D, breadcrumb icon 888*b* is labeled "file name" and may also display the attribute value, e.g., "nib-magnet.JPG", in some cases (not shown), indicating that a "file name" ontological set was selected and is a member of the visited collection. Breadcrumb icon 888*a* is labeled "hit", indicating that this was the first ontological set. Additional breadcrumbs can be added as further activation selections are made and ontological sets are added to the visited collection. The user may also select each breadcrumb icon to reformat main view to revert to a prior state. For example, selection of breadcrumb icon 888*a* may cause main view 420 to be re-rendered as though the activation selection of ontological set 832*d* had not been made.

Figure 8E:
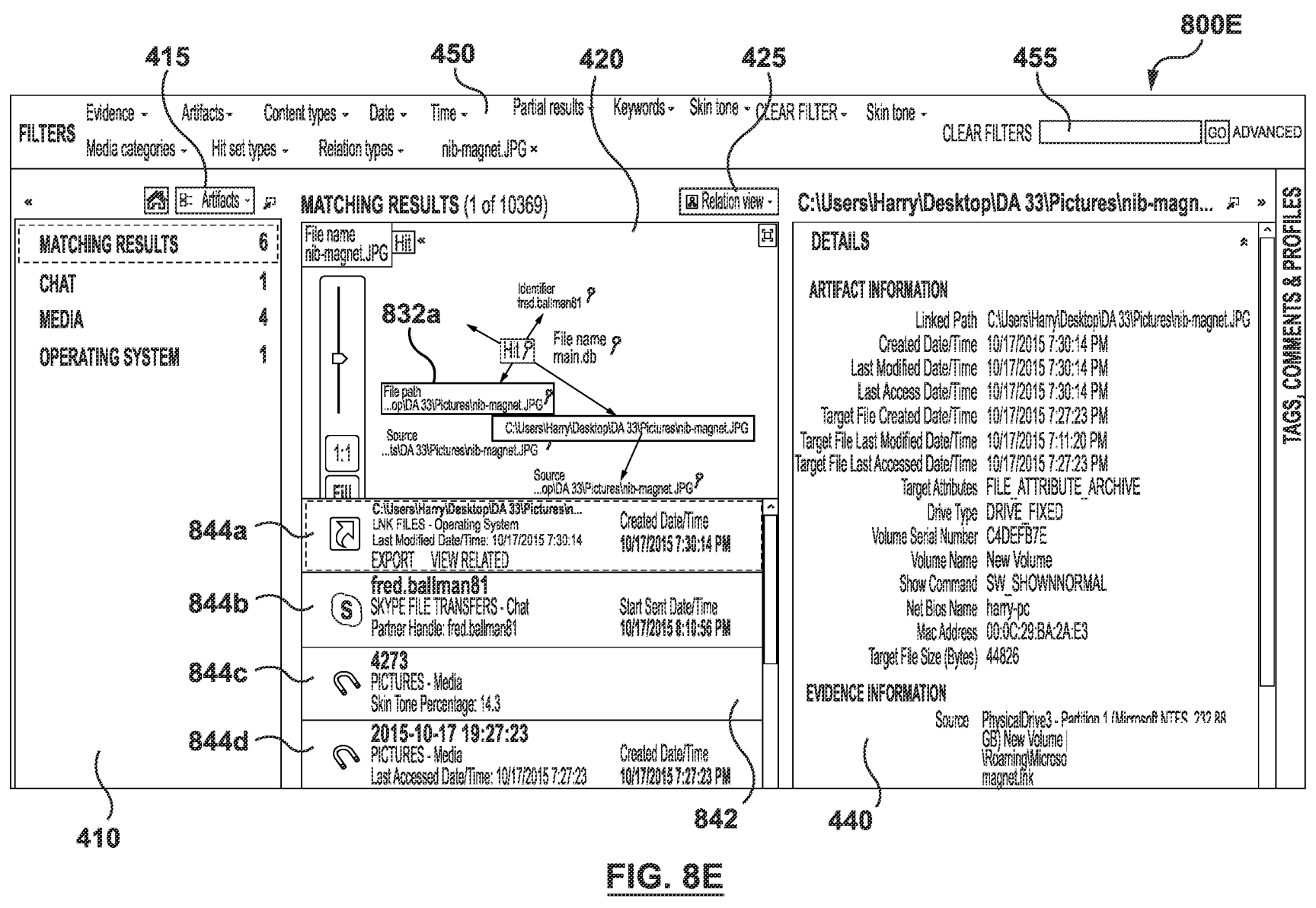

Referring now to FIG. 8E, there is shown an example of a graphical user interface, with the main view 420 in a relation graph presentation format. Graphical user interface 800E illustrates the relation graph presentation format of graphical user interface 800D when the detail view 440 is activated, and also when a row detail area 842 is displayed upon receipt of an activation selection of an ontological set while in the relation graph presentation format.

In graphical user interface 800E, main view 420 is reduced in size to provide area used by row detail area 842 and detail view 440.

Row detail area 842 displays artifacts associated with an ontological set as selected in main view 420. In the example shown, ontological set 832*a* is selected. Accordingly, artifacts 844*a* to 844*d*, which are members of ontological set 832*a*, are shown in row detail area 842.

Since ontological set 832*a* groups artifacts that share the attribute type of file path with the attribute value of "C:\Users\Harry\Desktop\DA33\Pictures\", each of artifacts 844*a* to 844*d* also contains such an attribute type and attribute value.

For example, artifact 844*a* is a Windows link (LNK) artifact. As the currently selected artifact in row detail area 842, the details of this artifact are shown in detail view 440. Various other attributes of artifact 844*a* are also displayed in detail view 440.

In some cases, the specific attribute that causes the artifact to belong to the selected ontological set may be highlighted in detail view 440, to emphasize its relevance. For example, in the example of FIG. 8E, the "Linked Path" attribute may be highlighted.

Figure 8F:
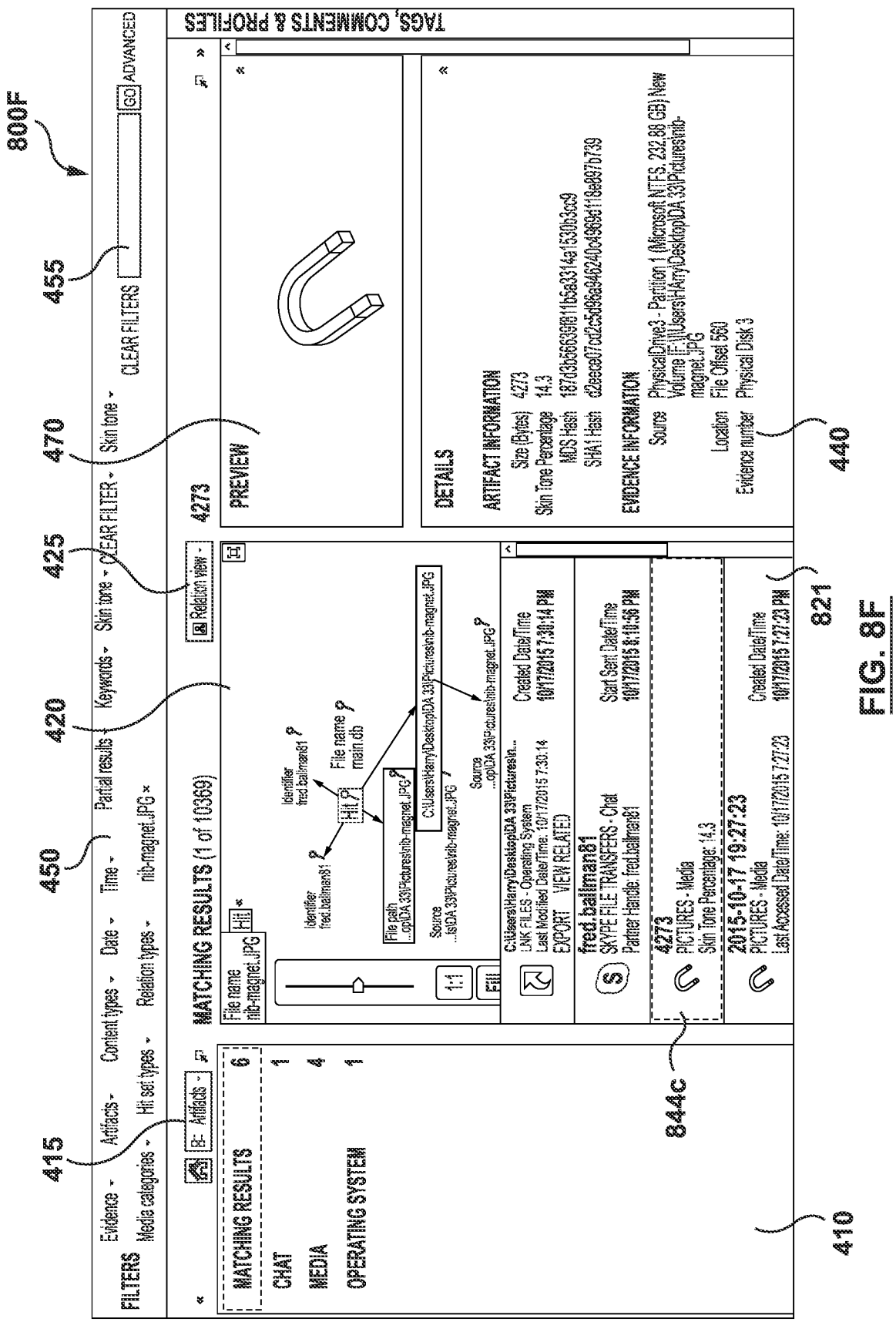
FIG. 8F is an example of another graphical user interface, with the main view in a relation graph presentation format.

When a user selects another artifact in row detail view 842, preview 470 and detail view 440 may be updated accordingly. For example, referring now to FIG. 8F, there is shown a graphical user interface 800F, which illustrates the relation graph presentation format of graphical user interface 800E when image artifact 844*c* is selected. Preview 470 is updated to display the image represented by artifact 844*c*, and details regarding the image artifact are displayed in detail view 440.

As noted above, not only ontological sets need be selected in main view 420. In some cases, an edge is selected in main view 420. In such cases, the row detail area 842 may display artifacts that are relevant to the relationship depicted by the edge. That is, the edge is indicative of a predicate relationship. Therefore, the row detail area 842 may display the artifacts that form the respective subject and object of that relationship. For example, if an edge representing the "had conversation with" predicate is selected, then one or more chat message artifacts between a first party (subject) and a second party (object) can be displayed in the row detail view 842.

Figure 9:
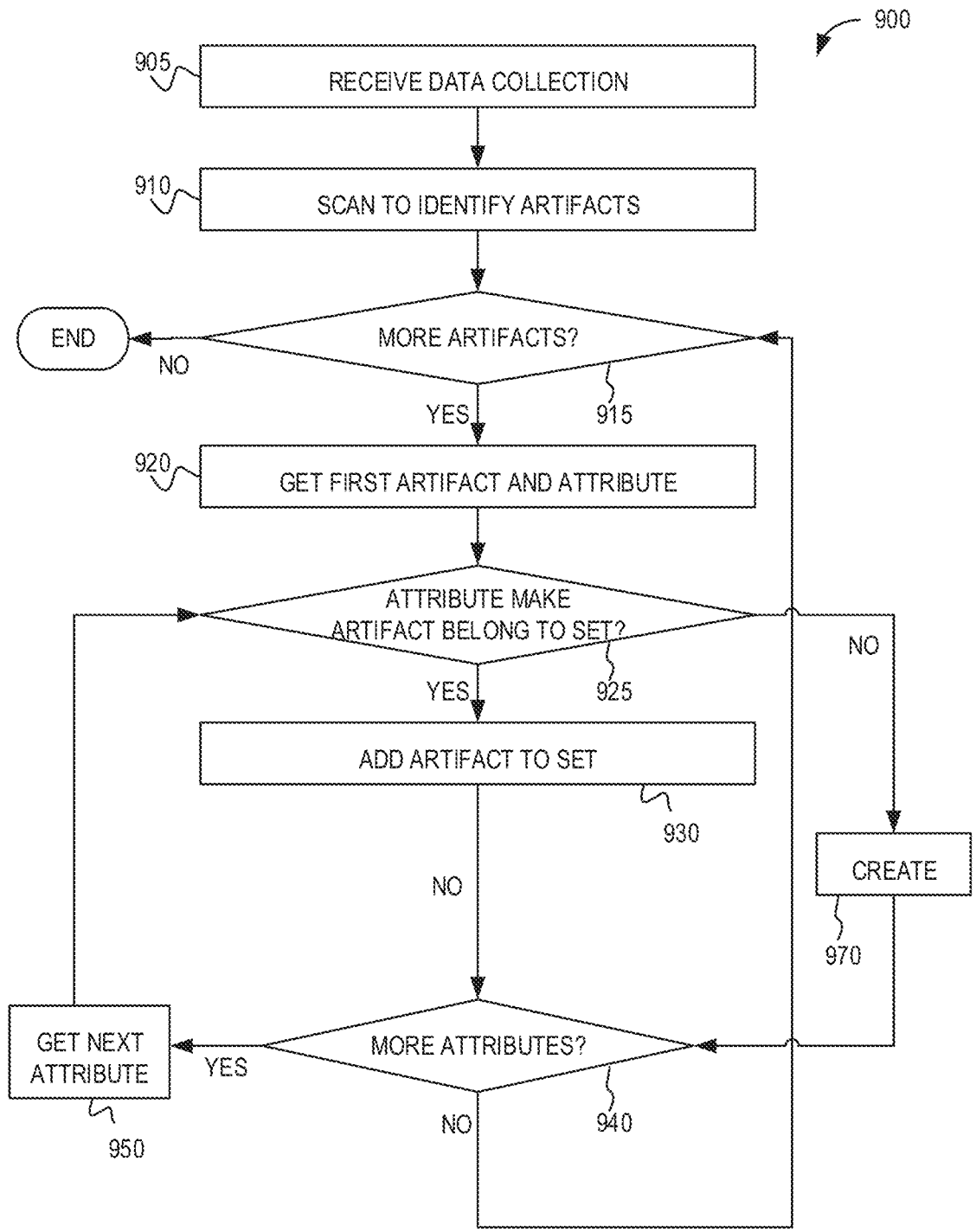
FIG. 9 is an example ontological set identification process flow in accordance with some example embodiments.

Referring now to FIG. 9, there is shown an example process flow in accordance with some example embodiments. Method 900 may be carried out, for example, using a computer 110 or 210 executing a forensic data retrieval application provided to the computer and stored thereon. The forensic data retrieval application contains executable instructions for manipulating data according to method 900 and thereby generating one or more ontological sets from a data collection.

Method 900 begins at 905, with the computer receiving a data collection containing data items. The data collection may be an image file or an electronic database file stored in a data storage device 130 as described herein. A data collection may contain data items retrieved from more than one target device. In such cases, each data item in the data collection may be tagged with information to identify the target device that is the source of the data item. Likewise, the data collection may contain data artifacts generated based on one or more other data items. In some cases, the computer may generate the data collection by scanning one or more target device, retrieving data items and generating artifacts from the data items.

At 910, the data collection is scanned to identify a plurality of artifacts and the computer tests to ensure that there is at least one unprocessed artifact at 915.

At 920, a first unprocessed artifact of the plurality of artifacts is identified at 920 and becomes the current working artifact, and at least one attribute possessed by the working artifact is determined.

The computer tests whether the at least one attribute corresponds to a known ontological set at 925 and, if it does, the current working artifact is added to such known ontological set at 930, based on possession of the common attribute.

At 940, the computer determines whether the artifact has any additional unprocessed attributes and, if yes, a next attribute is retrieved at 950 and the method returns to 925.

In this way, the plurality of ontological sets can be generated such that a first ontological set is associated with a first attribute, a second ontological set is associated with a second attribute, and so on. An artifact can be added to the first ontological set based on possession of the first attribute, and likewise the artifact can added to the second ontological set based on possession of the second attribute.

Generally, each ontological set has an attribute type and attribute value shared by all member artifacts. In some cases, multiple attribute types and values may be shared.

If there are no additional unprocessed attributes, a next artifact may be retrieved at 915 and the method may repeat from 920, until there are no more artifacts to process.

If a new attribute of the working artifact is encountered that does not belong to any known ontological set, a new ontological set may be created and associated with the attribute, and the working artifact added to that set, at 970.

Figure 10:
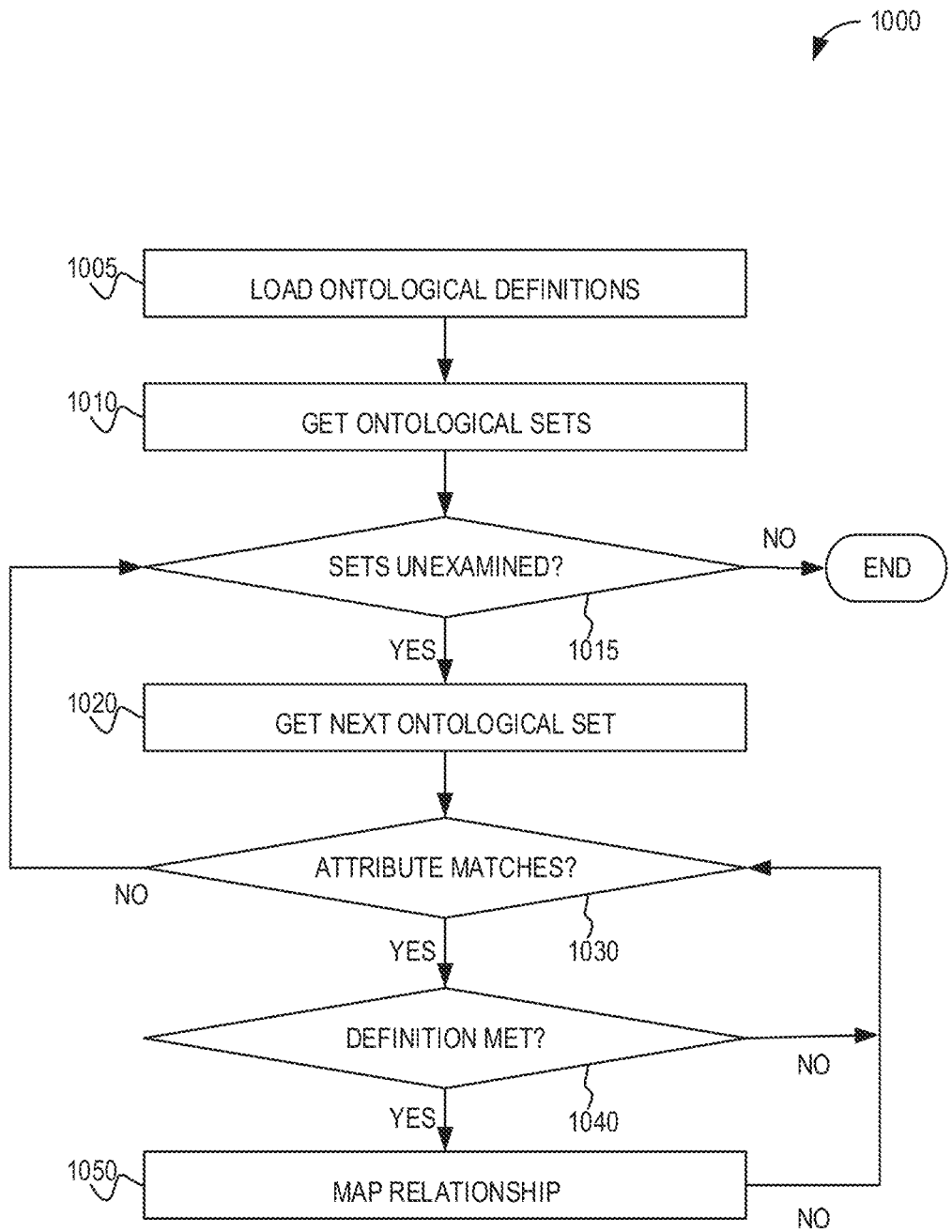
FIG. 10 is an example ontological set relationship process flow in accordance with some example embodiments.

Referring now to FIG. 10, there is shown an example process flow in accordance with some example embodiments. Method 1000 may be carried out, for example, using a viewer computer 110 or 210 executing a forensic data investigation application provided to the viewer computer and stored thereon, or else using a computer executing a forensic data retrieval application. The forensic data investigation or retrieval application contains executable instructions for manipulating data according to method 1000. In the case of a forensic data investigation application, it may contain instructions for generating and displaying a graphical user interface such as graphical user interface 300 or graphical user interfaces 400A to 400J, 800A to 800F.

Method 1000 begins at 1005, with the computer loading one or more ontological definitions. In some cases, ontological definitions may be hard-coded into the forensic data investigation application. In some cases, ontological definitions also may be user-configurable. For example, ontological definitions may be configured using a structured language such as extensible markup language (XML). In some cases, ontological definitions may be generated using a graphical user interface tool, which may optionally produce structured language output.

In some cases, ontological definitions may also be automatically generated—or attribute values automatically identified—based on a data collection, for example using machine learning algorithms, named entity analysis, keyword searching, facial recognition, regular expression searching (e.g., for phone numbers) or other techniques.

Generally, an ontological definition defines a subject, an object and a predicate. An ontological set (or, more particularly, the attribute shared by all members of the ontological set) can be the subject in an ontological definition, or it may be the object. For example, a shared file attribute related to chat messages can be the subject of the "file accessed by user id" definition in one instance. In another instance, a shared user id attribute related to chat messages can be the object of the "file accessed by user id" definition.

Some examples of ontological definitions are provided in Table 1 below. It will be appreciated that this is not an exhaustive list, and that a wide variety of combinations are possible, given the various artifacts, attributes and relationships that can be found.

TABLE 1

Example Ontological Definitions

| Subject | Predicate | Object |
|---|---|---|
| file | accessed on | system |
| file | accessed on | USB |
| file | accessed by | user id |
| file | transferred with | program name |
| file | transferred by | user id |
| file | related | cloud |
| file | emailed to | email address |
| file | downloaded with | program name |
| file | downloaded by | user id |
| contact name | contacted with | device |
| contact name | contacted by | person |
| picture hit | similar to | picture hit |
| file/msg | contains | key words |
| file/msg | references | file name |
| call log | call to | contact name |
| user id | used | program name |
| user id | searched for | key words |

At 1010, the computer retrieves the plurality of ontological sets associated with a data collection. The plurality of ontological sets may have been previously generated, for example using method 900 of FIG. 9, or if not then the ontological sets may be generated at 1010 using method 900.

At 1015, the computer determines whether there are any unexamined ontological sets and, when there are unexamined ontological sets, retrieves a next unexamined set at 1020.

At 1030, the computer determines whether the shared attribute of the current ontological set is the subject or object of an ontological definition. If the shared attribute is the subject or object of an ontological definition, then the computer determines whether there is any relationship that satisfies an ontological definition at 1040. This may be repeated as necessary for one or more ontological definitions, by returning to 1030, before returning to 1015 to examine other unexamined ontological sets.

If an ontological definition is matched at 1040, then the relationship may be mapped at 1050. For example, the relationship may be stored in a relationship database. One example database schema, using three tables, is shown below in Tables 2 to 4.

TABLE 2

Example Ontological Set Table ("hit_set")

| | hit_set |
|---|---|
| CHAR(32) NOT NULL UNIQUE | hit_set_id |
| CHAR(32) NOT NULL | scan_id |
| TEXT NOT NULL | hit_set_type |
| TEXT NOT NULL | canonical_value |

TABLE 3

Example Ontological Set Relationship ("hit_set_relationship")

| | hit_set_relationship |
|---|---|
| CHAR(32) NOT NULL UNIQUE | hit_set_relationship_id |
| CHAR(32) NOT NULL | from_hit_set_id |
| TEXT NOT NULL | relation_type |
| CHAR(32) NOT NULL | to_hit_set_id |

TABLE 4

Example Ontological Set Member ("hit_set_member")

| | hit_set_member |
|---|---|
| CHAR(32) NOT NULL UNIQUE | hit_set_member_id |
| CHAR(32) NOT NULL | hit_set_id |
| CHAR(32) NOT NULL | artifact_version_id |
| CHAR(32) NOT NULL | hit_id |
| CHAR(32) | hit_fragment_id |

Various other file or database structures may be used to represent relationships.

As at 1040, the computer may also attempt to match additional definitions by returning to 1030.

Figure 11:
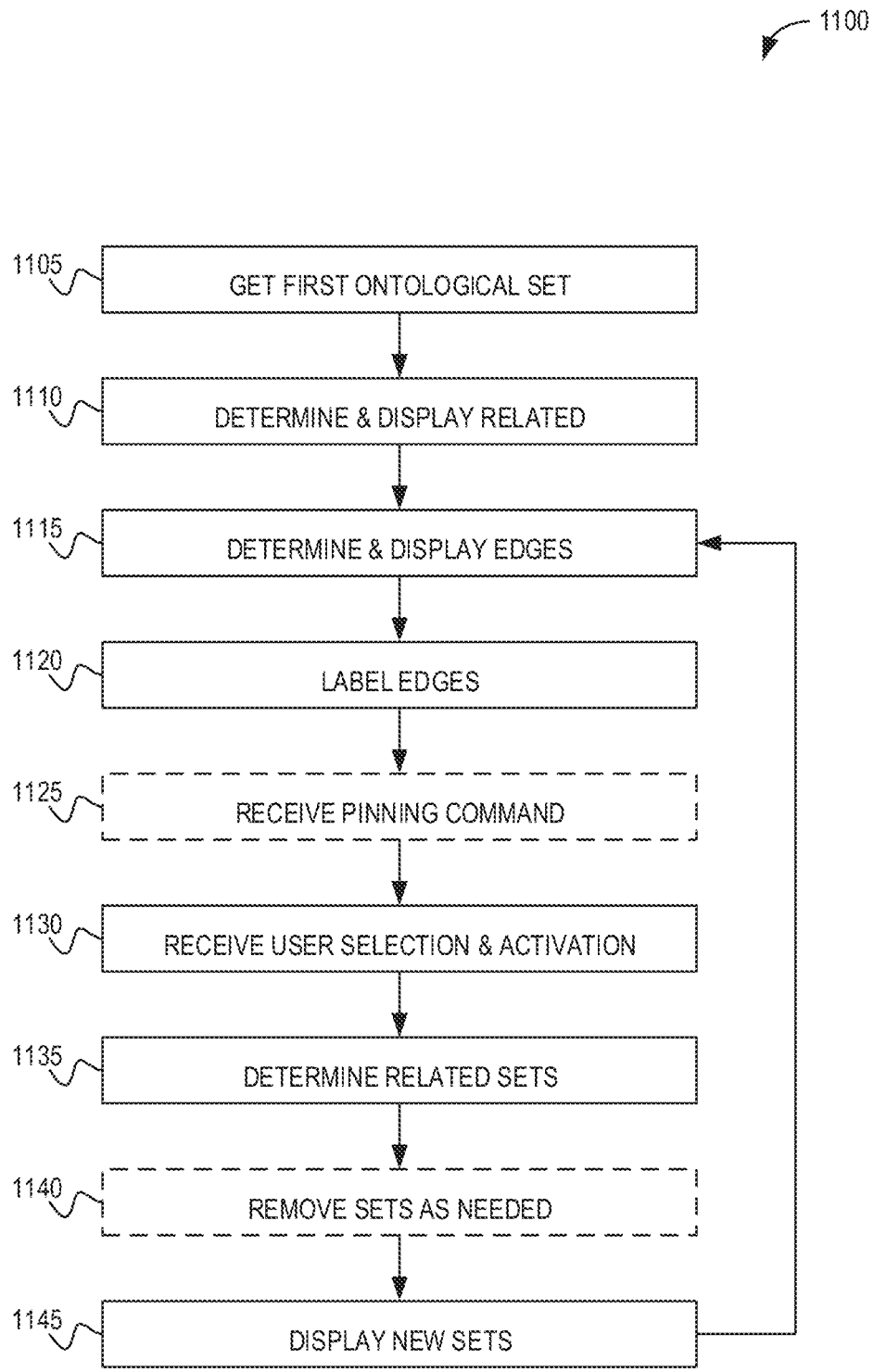
FIG. 11 is an example display process flow in accordance with some example embodiments.

Referring now to FIG. 11, there is shown an example process flow in accordance with some example embodiments. Method 1100 may be carried out, for example, using a viewer computer 110 or 210 executing a forensic data investigation application provided to the viewer computer and stored thereon. The forensic data investigation application contains executable instructions for manipulating data according to method 1100 and thereby generating and displaying a graphical user interface such as graphical user interface 300 or graphical user interfaces 400A to 400J and 800A to 800F.

Method 1100 begins at 1105, with the viewer computer receiving a first ontological set. This may occur, for example, where the user has selected an artifact in a main view and selected "View Related" from the contextual menu, or where the use has selected a file related to multiple artifacts in a file view and selected "View Related", in which case the first ontological set includes the multiple artifacts related to the selected file.

At 1110, the viewer computer determines a plurality of ontological sets related to the first ontological set, e.g., using the relationship database described herein, and displays the first ontological set and the plurality of ontological sets. For example, the first ontological set and the plurality of ontological sets can be displayed as nodes in a relation graph presentation format as shown in FIG. 8C.

At 1115, the viewer computer determines, for each respective ontological set in the plurality of ontological sets, a respective relationship between the first ontological set and the respective ontological set, and displays a respective edge connecting the first artifact and the respective set. For example, the edges may be edges such as edges 834a to 834g, as shown in FIG. 8C, and the relationship may be based on one or more ontological definition.

In some cases, labels for each edge may be displayed at 1120, as shown in FIG. 8C for example.

Optionally, at 1125, the viewer computer may receive one or more pinning commands related to displayed ontological sets or nodes, as described with reference to FIG. 8C. For example, the user may select the pin icon associated with a node, and the pin icon may be modified to indicate a selected status (e.g., by shading). Likewise, pinned nodes may be unpinned upon receipt of a further command, in which case the pin icon may revert to a non-selected status.

At 1130, the viewer computer receives a user selection of a selected ontological set, such as a click on a node that represents the selected ontological set. The user may provide an activation selection by, for example, selecting an option in a contextual menu, double-clicking, right-clicking, clicking a user interface element, and so on.

Upon receiving the user selection and activation selection, the viewer computer at 1135 can determine a second plurality of ontological sets, in this case related to the selected ontological set by virtue of sharing at least one attribute of the selected ontological set.

Optionally, if there are ontological sets from the plurality of ontological sets as originally displayed that are unpinned, unselected, or not part of the visited collection, these may be removed from display at 1140.

At 1145, the second plurality of ontological sets can be displayed in similar fashion to the plurality of ontological sets as originally displayed.

The viewer computer can thereupon return to 1115 to determine and display edges and labels, and proceed further if further input is received.

Figure 12:
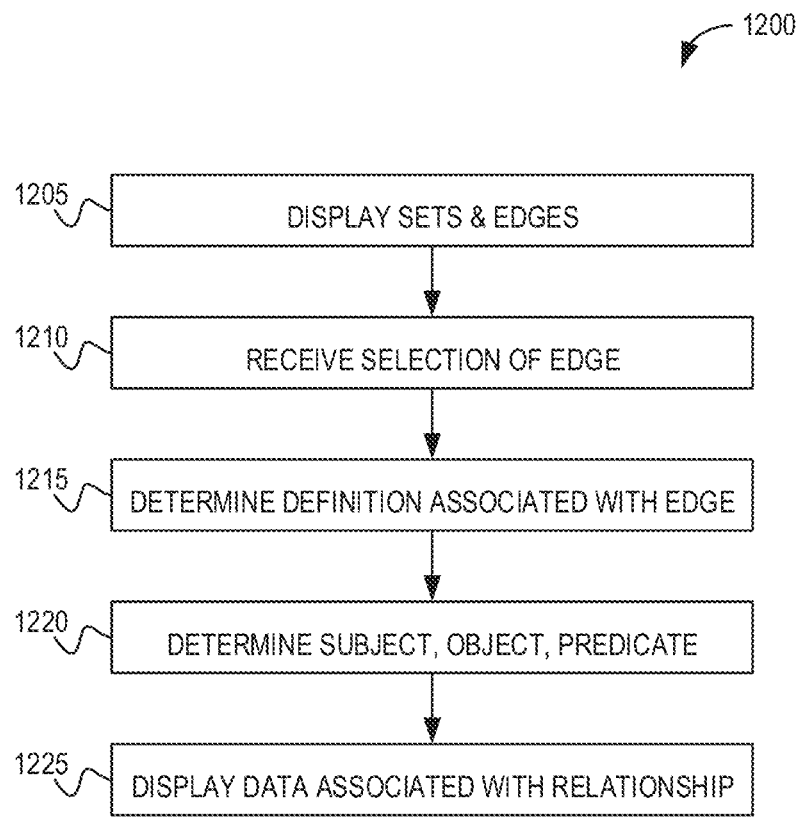
FIG. 12 is an example exploration flow in accordance with some example embodiments.

Referring now to FIG. 12, there is shown an example process flow in accordance with some example embodiments. Method 1200 may be carried out, for example, using a viewer computer 110 or 210 executing a forensic data investigation application provided to the viewer computer and stored thereon. The forensic data investigation application contains executable instructions for manipulating data according to method 1200 and thereby generating and displaying a graphical user interface such as graphical user interface 300 or graphical user interfaces 400A to 400J and 800A to 800F.

Method 1200 begins at 1205, with the viewer computer displaying a plurality of ontological sets and their respective connecting edges. The display can be performed as in method 1100 of FIG. 11, for example.

At 1210, the viewer computer receives a user selection of a selected edge, and determines the corresponding ontological definition associated with the edge at 1215.

At 1220, based on the corresponding ontological definition, the viewer computer determines the subject ontological set, object ontological set and predicate relationship.

At 1225, the viewer computer can display data associated with the selected edge, or the ontological sets that are the subject or object, or both. For example, the viewer computer may open a row detail area and a detail view, as described with reference to FIG. 8F, and display the additional data regarding artifacts or attributes associated with the subject or object sets.

In some embodiments, at least one filter input can be received via the graphical user interface, which can cause ontological sets (or their representative nodes) to be filtered from display in the graphical user interface. In such cases, an active filter indication can be displayed to indicate that the filter is in effect.

In particular, a filter criteria can be determined based on the at least one filter input, and applied to the plurality of ontological sets. Based on the filter criteria, one or more ontological sets can be removed from display. Subsequently, if additional filter input is received, the filter criteria can be re-determined and re-applied, causing at least one ontological set to be re-displayed.

It will be appreciated that various aspects of methods 900, 1000, 1100 and 1200 may be performed in different orders, or aspects of the methods may be combined into a one or more methods, or divided into additional methods.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

We claim:

1. A method of examining digital forensic data using a viewer computer comprising a memory and a processor, the digital forensic data extracted from at least one target device by a forensic data retrieval application, the method comprising:

receiving, at the viewer computer, a data collection generated by the forensic data retrieval application, the data collection comprising a plurality of data items extracted from the at least one target device;

for a first artifact in a plurality of artifacts, determining at least one attribute possessed by the first artifact, and adding the first artifact to at least one of a plurality of ontological sets based on possession of the at least one attribute;

determining that the first ontological set is related to the plurality of ontological sets;

displaying the first ontological set and the plurality of ontological sets in an ontological display in a graphical user interface, wherein each of the plurality of ontological sets are displayed respectively as nodes in a graph;

for each respective set in the plurality of ontological sets, determining a respective relationship between the first ontological set and the respective set, and displaying a respective edge connecting a first node representing the first ontological set and a respective node representing the respective set;

receiving a user edge selection of a selected edge in the graphical user interface;

determining a selected ontological definition associated with the selected edge;

determining a selected subject, a selected object and a selected predicate associated with the selected ontological definition;

displaying data associated with the selected subject and the selected object in the graphical user interface;

receiving at least one filter input via the graphical user interface;

filtering the graphical user interface based on the at least one filter input; and displaying an active filter indication to indicate that the graphical user interface is filtered based on the at least one filter input.

2. The method of claim 1, wherein the plurality of ontological sets comprises a first ontological set associated with a first attribute, and a second ontological set associated with a second attribute.

3. The method of claim 2, wherein the first artifact is added to the first ontological set based on possession of the first attribute, and wherein the first artifact is added to the second ontological set based on possession of the second attribute.

4. The method of claim 3, wherein the first ontological set comprises at least one additional artifact, and wherein the first artifact and the at least one additional artifact each possess the first attribute in common.

5. The method of claim 1, wherein the at least one attribute comprises a third attribute, further comprising creating a third ontological set in the plurality of ontological sets, the third ontological set associated with the third attribute, wherein the first artifact is added to the third ontological set based on possession of the third attribute.

6. The method of claim 2, further comprising:
providing a forensic data investigation application to the viewer computer.

7. The method of claim 1, further comprising displaying a respective label corresponding to each respective edge.

8. The method of claim 1, wherein each respective relationship is determined based on at least one ontological definition.

9. The method of claim 8, wherein each respective relationship defines a subject, an object and a predicate based on the at least one ontological definition, and wherein each respective relationship corresponds to one or more respective predicate of the at least one ontological definition.

10. The method of claim 6, further comprising:
receiving a user selection of a second selected ontological set in the plurality of ontological sets via the graphical user interface;
determining a second plurality of ontological sets, wherein each of the second plurality of ontological sets is related to the second selected ontological set; and
displaying the second plurality of ontological sets in the ontological display.

11. The method of claim 10, further comprising, prior to receiving the user selection, adding the first ontological set to a visited collection and, after receiving the user selection, adding the selected ontological set to the visited collection.

12. The method of claim 11, further comprising:
prior to receiving the user selection of the selected ontological set, receiving a pinning command associated with a subset of the plurality of ontological sets to determine a pinned subset of ontological sets; and
following determining the second plurality of ontological sets, removing from the graphical user interface any of the plurality of ontological sets that are not also members of the pinned subset of ontological sets, the visited collection or the second plurality of ontological sets.

13. The method of claim 1, wherein the filtering comprises:
determining a filter criteria based on the at least one filter input;
applying the filter criteria to the plurality of ontological sets; and
based on the application of the filter criteria, removing from display at least one filtered ontological set.

14. The method of claim 13, wherein the filtering further comprises:
receiving at least one additional filter input via the graphical user interface;
re-determining the filter criteria based on the at least one additional filter input;
re-applying the filter criteria to the plurality of ontological sets; and
based on the re-application of the filter criteria, re-displaying at least one ontological set.

15. A non-transitory computer-readable medium storing computer-executable instructions, the instructions when executed by a computer processor for causing the computer processor to carry out the method of claim 1.

16. A viewer computer comprising a memory and a processor, the processor configured to carry out the method of claim 1.

17. The method of claim 1, further comprising, scanning the data collection, in response to receiving the data collection, to identify a plurality of data artifacts.

18. The method of claim 1, wherein each of the nodes is selectable in the graphical user interface.

19. The method of claim 1, wherein each respective edge is selectable in the graphical user interface.

* * * * *